US012338738B2

(12) United States Patent
Dhaka et al.

(10) Patent No.: US 12,338,738 B2
(45) Date of Patent: Jun. 24, 2025

(54) VARIABLE FLOWPATH CASINGS FOR BLADE TIP CLEARANCE CONTROL

(71) Applicant: General Electric Company, Schenectady, NY (US)

(72) Inventors: Pankaj Dhaka, Bengaluru (IN); Paul Mathew, Bengaluru (IN); Ravindra Shankar Ganiger, Bengaluru (IN); Gautam Naik, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/889,899

(22) Filed: Aug. 17, 2022

(65) Prior Publication Data

US 2024/0011410 A1 Jan. 11, 2024

(30) Foreign Application Priority Data

Jul. 5, 2022 (IN) ............................ 202211038562

(51) Int. Cl.
*F01D 11/24* (2006.01)

(52) U.S. Cl.
CPC .......... *F01D 11/24* (2013.01); *F05D 2220/32* (2013.01); *F05D 2240/55* (2013.01); *F05D 2260/60* (2013.01)

(58) Field of Classification Search
CPC .. F01D 11/24; F05D 2220/32; F05D 2240/55; F05D 2260/60
See application file for complete search history.

(56) References Cited

U.S. PATENT DOCUMENTS

| | | | | |
|---|---|---|---|---|
| 3,085,398 | A | 4/1963 | Frederick | |
| 4,482,293 | A | 11/1984 | Perry | |
| 4,596,116 | A * | 6/1986 | Mandet | F01D 11/08 60/785 |
| 5,054,997 | A | 10/1991 | Corsmeier et al. | |
| 5,188,507 | A | 2/1993 | Sweeney | |
| 5,203,673 | A | 4/1993 | Evans | |
| 5,362,202 | A | 11/1994 | Derouet et al. | |

(Continued)

FOREIGN PATENT DOCUMENTS

| | | |
|---|---|---|
| EP | 2466075 A2 | 6/2012 |
| FR | 3129428 A1 | 5/2023 |

(Continued)

OTHER PUBLICATIONS

JP-2012202330-A (Oct. 22, 2012; Fujioka et al.) English Translation (Year: 2024).*

(Continued)

*Primary Examiner* — David E Sosnowski
*Assistant Examiner* — Aye S Htay
(74) *Attorney, Agent, or Firm* — Hanley, Flight & Zimmerman, LLC

(57) ABSTRACT

Disclosed herein are example variable flowpath casings for blade tip clearance control. An example casing for a turbine engine includes a first annular substrate extending along an axial direction, the first annular substrate defining a cavity at a radially inward surface of the first annular substrate, a second annular substrate positioned at least partially within the cavity of the first annular substrate, and a tension belt extending circumferentially around a periphery of the second annular substrate.

20 Claims, 11 Drawing Sheets

(56) References Cited

U.S. PATENT DOCUMENTS

| | | | | |
|---|---|---|---|---|
| 6,514,041 | B1 | 2/2003 | Matheny et al. | |
| 6,962,482 | B2 | 11/2005 | Tanaka | |
| 7,186,078 | B2 | 3/2007 | Tanaka | |
| 7,189,057 | B2 * | 3/2007 | Lee | F01D 11/16 415/128 |
| 7,255,528 | B2 | 8/2007 | Stretton | |
| 7,367,776 | B2 | 5/2008 | Albers et al. | |
| 7,596,954 | B2 | 10/2009 | Penda et al. | |
| 7,625,169 | B2 | 12/2009 | Manzoori | |
| 8,257,029 | B2 * | 9/2012 | Habarou | F01D 11/08 415/170.1 |
| 8,475,118 | B2 | 7/2013 | Mulcaire et al. | |
| 8,678,742 | B2 | 3/2014 | Klingels | |
| 8,834,096 | B2 | 9/2014 | Khanin | |
| 8,939,709 | B2 | 1/2015 | Nanukuttan et al. | |
| 9,068,471 | B2 | 6/2015 | Klingels | |
| 9,255,489 | B2 | 2/2016 | DiTomasso et al. | |
| 9,371,738 | B2 | 6/2016 | Harris | |
| 9,598,975 | B2 | 3/2017 | Uskert et al. | |
| 9,683,453 | B2 | 6/2017 | Sha et al. | |
| 9,709,713 | B1 * | 7/2017 | Chen | G02B 5/0841 |
| 9,752,450 | B2 | 9/2017 | Dugay et al. | |
| 9,845,731 | B2 | 12/2017 | Birnkrant et al. | |
| 9,963,988 | B2 | 5/2018 | Swedowicz et al. | |
| 10,316,682 | B2 * | 6/2019 | Vetters | F01D 25/005 |
| 10,352,329 | B2 | 7/2019 | Nesteroff et al. | |
| 10,364,696 | B2 | 7/2019 | Virkler | |
| 10,415,419 | B2 | 9/2019 | Sun et al. | |
| 10,753,222 | B2 | 8/2020 | Eastwood et al. | |
| 11,008,882 | B2 | 5/2021 | Dierksmeier | |
| 11,255,214 | B2 | 2/2022 | Prasad et al. | |
| 11,808,157 | B1 | 11/2023 | K P et al. | |
| 12,012,859 | B2 | 6/2024 | Chinta et al. | |
| 2009/0128166 | A1 * | 5/2009 | Webster | F01D 11/22 324/662 |
| 2009/0208322 | A1 * | 8/2009 | McCaffrey | F01D 11/125 415/113 |
| 2010/0303612 | A1 * | 12/2010 | Bhatnagar | F01D 11/22 415/127 |
| 2012/0057958 | A1 | 3/2012 | Klingels | |
| 2012/0063884 | A1 | 3/2012 | Klingels | |
| 2012/0156007 | A1 | 6/2012 | Bacic | |
| 2013/0022442 | A1 | 1/2013 | Nanukuttan | |
| 2013/0034423 | A1 | 2/2013 | Adaickalasamy et al. | |
| 2013/0177414 | A1 | 7/2013 | Bonneau et al. | |
| 2014/0064938 | A1 * | 3/2014 | Eriksen | F01D 21/045 415/173.3 |
| 2015/0044044 | A1 * | 2/2015 | Sippel | F01D 25/246 415/220 |
| 2015/0218959 | A1 | 8/2015 | Barb et al. | |
| 2016/0102571 | A1 * | 4/2016 | Cortequisse | F01D 11/22 415/173.2 |
| 2016/0177753 | A1 * | 6/2016 | Walston | F01D 9/04 416/182 |
| 2016/0281522 | A1 | 9/2016 | Graf et al. | |
| 2016/0356168 | A1 | 12/2016 | Duguay et al. | |
| 2017/0067366 | A1 | 3/2017 | Stricker | |
| 2017/0328230 | A1 | 11/2017 | Virkler | |
| 2018/0209292 | A1 | 7/2018 | Hiernaux | |
| 2019/0048737 | A1 | 2/2019 | Geisen et al. | |
| 2019/0128135 | A1 | 5/2019 | Skertic | |
| 2020/0332671 | A1 | 10/2020 | Dierksmeier | |
| 2021/0348519 | A1 | 11/2021 | Lee et al. | |

FOREIGN PATENT DOCUMENTS

| | | | | |
|---|---|---|---|---|
| FR | 3129432 | | 5/2023 | |
| FR | 3130879 | A1 | 6/2023 | |
| FR | 3130894 | A1 | 6/2023 | |
| FR | 3132743 | A1 | 8/2023 | |
| JP | 2012202330 | A * | 10/2012 | F01D 5/26 |

OTHER PUBLICATIONS

United States Patent and Trademark Office, "Non-Final Office Action," in connection with U.S. Appl. No. 17/899,324, issued Mar. 7, 2023, 23 pages.

United States Patent and Trademark Office, "Notice of Allowance and Fee(s) Due" in connection with U.S. Appl. No. 17/899,324, issued Jun. 22, 2023, 7 pages.

United States Patent and Trademark Office, "Non-Final Office Action," issued in connection with U.S. Appl. No. 17/894,881, dated Sep. 20, 2023, 9 pages.

United States Patent and Trademark Office, "Non-Final Office Action," issued in connection with U.S. Appl. No. 18/493,508, dated Jul. 5, 2024, 14 pages.

United States Patent and Trademark Office, "Non-Final Office Action," issued in connection with U.S. Appl. No. 18/657,420, dated Sep. 10, 2024, 10 pages.

United States Patent and Trademark Office, "Notice of Allowance and Fee(s) Due," issued in connection with U.S. Appl. No. 18/493,508, dated Dec. 4, 2024, 7 pages.

* cited by examiner

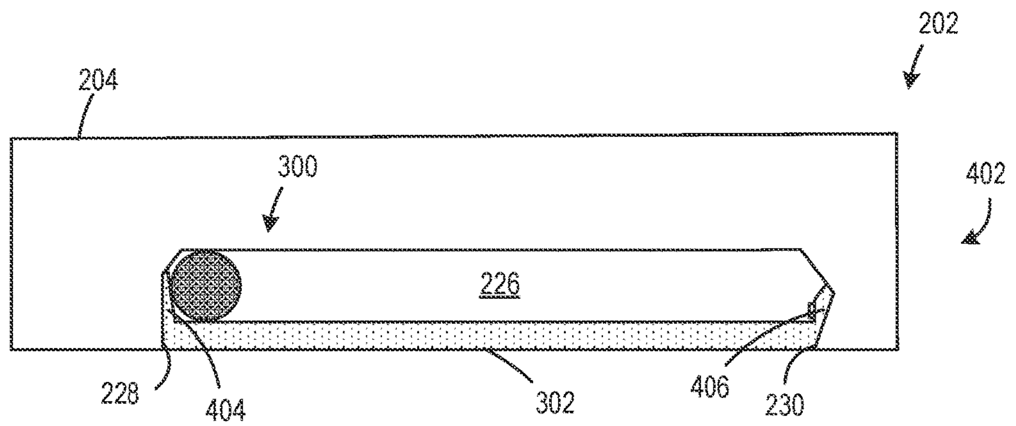
FIG. 4A
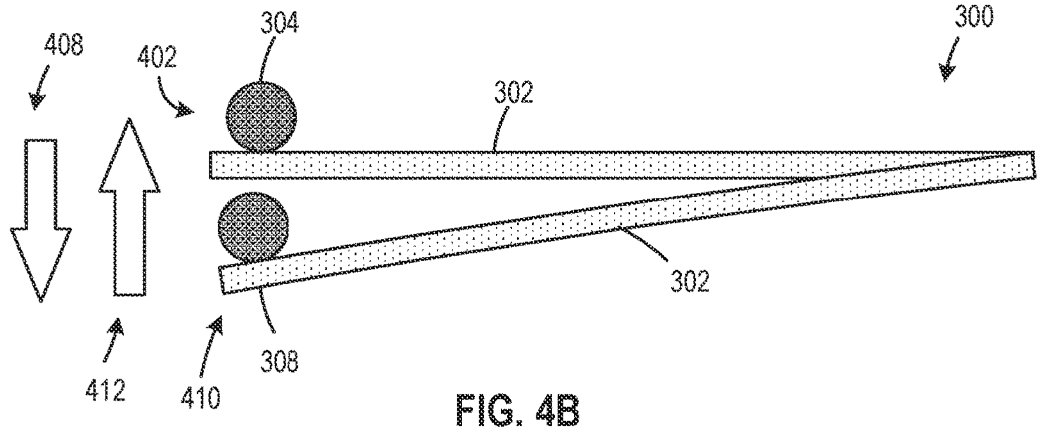
FIG. 4B
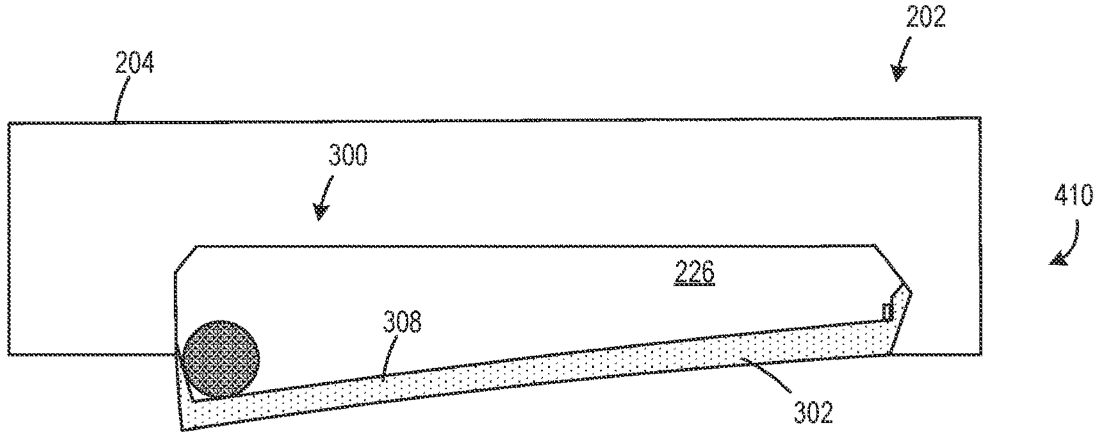
FIG. 4C
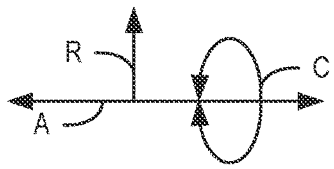

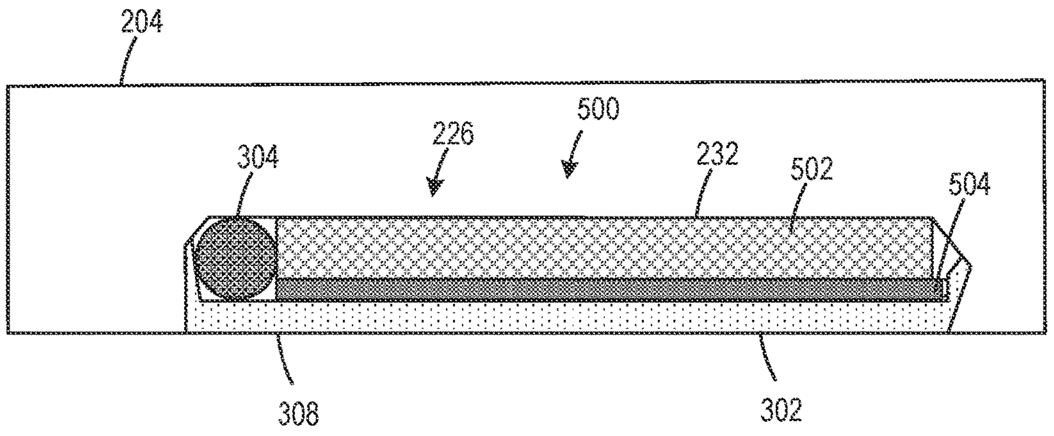
FIG. 5
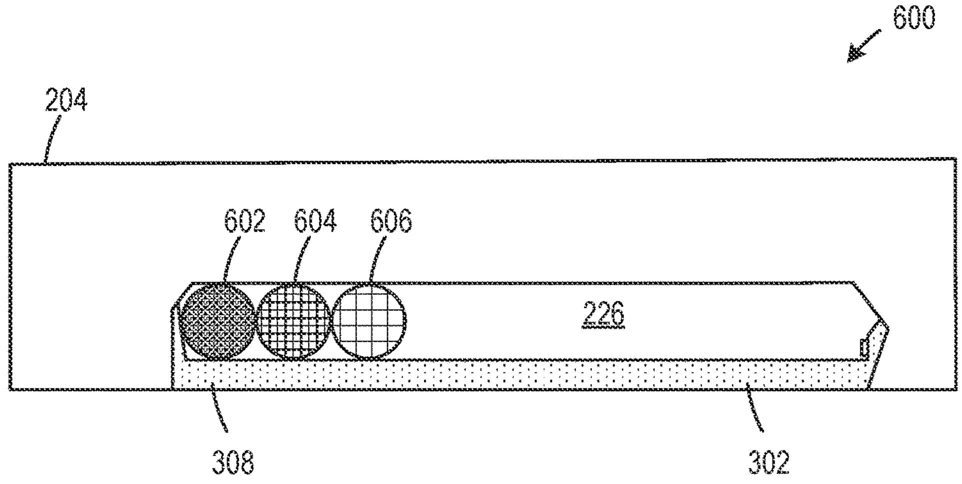
FIG. 6
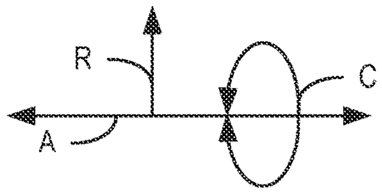

VARIABLE FLOWPATH CASINGS FOR BLADE TIP CLEARANCE CONTROL

CROSS-REFERENCE TO RELATED APPLICATION

This patent claims benefit to Indian Provisional Patent Application No. 202211038562, which was filed on Jul. 5, 2022, and which is hereby incorporated herein by reference in its entirety. Priority to Indian Provisional Patent Application No. 202211038562 filed with the Intellectual Property of India on Jul. 5, 2022, is hereby claimed.

FIELD OF THE DISCLOSURE

This disclosure relates generally to turbine engines and, more particularly, to casings in turbine engines.

BACKGROUND

A turbine engine, also referred to herein as a gas turbine engine, is a type of internal combustion engine that uses atmospheric air as a moving fluid. A turbine engine generally includes a fan and a core arranged in flow communication with one another. As atmospheric air enters the turbine engine, rotating blades of the fan and the core impel the air downstream, where the air is compressed, mixed with fuel, ignited, and exhausted. Typically, at least one casing or housing surrounds the turbine engine.

BRIEF DESCRIPTION OF THE DRAWINGS

FIG. 4A is a schematic cross-sectional axial view of the example variable flowpath casing of FIGS. 3A and 3B, including the variable flowpath component in a first position.

FIG. 4B is a schematic illustration of example movement of the variable flowpath component of FIGS. 3A, 3B, and 4A.

FIG. 4C is a schematic cross-sectional axial view of the variable flowpath casing of FIGS. 3A and 3B, including the variable flowpath component in a second position.

FIG. 5 is a schematic cross-sectional axial view of another example variable flowpath component for a variable flowpath casing in accordance with the teachings of this disclosure.

FIG. 6 is a schematic cross-sectional axial view of another example variable flowpath component for a variable flowpath casing in accordance with the teachings of this disclosure.

Figure 1:
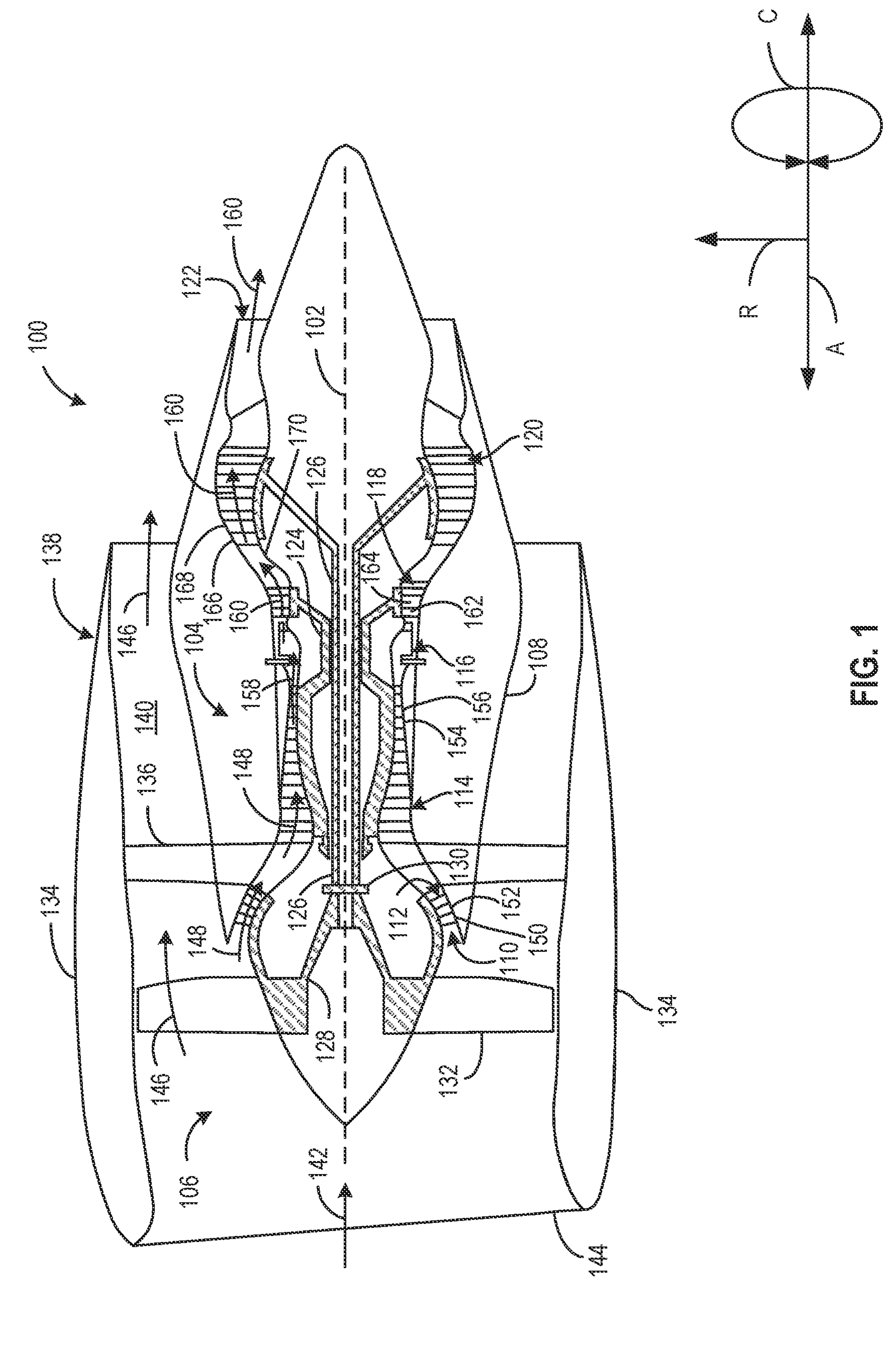
FIG. 1 is a cross-sectional view of an example gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this disclosure, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, “approximately” and “about” may indicate such dimensions may be within a tolerance range of +/−10% unless otherwise specified in the below description. As used herein “substantially real time” refers to occurrence in a near instantaneous manner recognizing there may be real world delays for computing time, transmission, etc. Thus, unless otherwise specified, “substantially real time” refers to real time +/−1 second. In some examples used herein, the term “substantially” is used to describe a relationship between two parts that is within three degrees of the stated relationship (e.g., a substantially same relationship is within three degrees of being the same, a substantially flush relationship is within three degrees of being flush, etc.). In some examples used herein, the term “substantially” is used to describe a value that is within 10% of the stated value.

In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin in either individual values, range(s) of values and/or endpoints defining range(s) of values.

As used herein, the phrase “in communication,” including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The terms “upstream” and “downstream” refer to the relative direction with respect to fluid flow in a fluid pathway. For example, “upstream” refers to the direction from which the fluid flows, and “downstream” refers to the direction to which the fluid flows. The terms “forward” and “aft” refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

Various terms are used herein to describe the orientation of features. In general, the attached figures are annotated with reference to the axial direction, radial direction, and circumferential direction of the vehicle associated with the features, forces and moments. In general, the attached figures are annotated with a set of axes including the axial axis A, the radial axis R, and the circumferential axis C.

As used herein, “processor circuitry” is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

Turbine engines are some of the most widely-used power generating technologies, often being utilized in aircraft and power-generation applications. A turbine engine generally includes a fan positioned forward of a core, which includes, in serial flow order, a compressor section (e.g., including one or more compressors), a combustion section, a turbine section (e.g., including one or more turbines), and an exhaust section. A turbine engine can take on any number of different configurations. For example, a turbine engine can include one or more compressors and turbine, single or multiple spools, ducted or unducted fans, geared architectures, etc. In some examples, the fan and a low pressure compressor are on the same shaft as a low pressure turbine and a high pressure compressor is on the same shaft as a high pressure turbine.

In operation, rotating blades of the fan pull atmospheric air into the turbine engine and impel the air downstream. At least a portion of the air enters the core, where the air is compressed by rotating blades of a compressor, combined with fuel and ignited to generate a flow of a high-temperature, high-pressure gas (e.g., hot combustion gas), and fed to the turbine section. The hot combustion gases expand as they flow through the turbine section, causing rotating blades of the turbine(s) to spin and produce a shaft work output(s). For example, rotating blades of a high pressure turbine can produce a first shaft work output that is used to drive a first compressor, while rotating blades of a low pressure turbine can produce a second shaft work output that is used to drive a second compressor and/or the fan. In some examples, another portion of the air bypasses the core and, instead, is impelled downstream and out an exhaust of the turbine engine (e.g., producing a thrust).

Typically, a turbine engine includes one or more casings that surround components of the turbine engine and define a flow passage for airflow through the turbine engine. For example, the turbine engine can include a fan casing that surrounds rotor blades of the fan and one more core casings that surround rotor blades of the compressor section and/or the turbine section. A distance between a tip of a rotor blade (e.g., a rotating blade such as a fan blade, a compressor blade, etc.) and a respective casing(s) is referred to as a tip clearance. Typically, rotor blades are made using a material that is different than a material of a casing surrounding the rotor blades. A fan blade(s), for example, may be manufactured using a metal (e.g., titanium, aluminum, lithium, etc., and/or a combination thereof), whereas a casing surrounding the fan blade(s) can be made of a composite material. Thus, in some such examples, the fan blade(s) and the casing can expand at different rates based on different rates of thermal expansion of their respective materials.

In operation, the casing(s) and rotor blades experience a variety of loads that influence tip clearance, such as thermal loads, pressure loads, and/or mechanical loads. For example, during operation, metal rotor blades may contract in response to relatively low ambient temperatures (e.g., based on differential thermal expansion), while a composite case may not contract, resulting in tip clearance opening. Over a time period of engine operation, tip clearance can transition between a relatively large clearance and a relatively small clearance due to rotor growth and casing growth (e.g., through rotational speed of a rotor, thermal expansion of the rotating components and the casing, etc.). These transitions can result in issues with tip clearance, which can negatively impact the operability and performance of the turbine engine. In some instances, tip clearance between a blade and a casing can be substantially non-existent. In such instances, the rotor blade can rub against the casing (e.g., referred to herein as blade tip rubbing), which can result in damage to the casing, the blade, and/or another component of the turbine engine. In some instances, a relatively large tip clearance can result in performance losses. For example, a relatively large tip clearance can result in tip leakage flow. Tip leakage flow as disclosed herein refers to air flow losses in a region of the casing associated with a rotor blade tip (e.g., a tip region).

The flow field of air in the tip region (e.g., fan blade tip region, compressor blade tip region, etc.) is relatively complex due to generation of vortical structures by interaction of the axial flow with the rotor blades and a surface (e.g., of the casing) near the rotor blade tips. In the fan, for example, as tip clearance between a fan blade and a fan case increase, several vortices in the tip region are generated (e.g., tip leakage, separation and induced vortices). These interactions can lead to substantial aerodynamic loss in the fan and decreased efficiency of the turbine engine. Thus, performance of the fan is closely related to its tip leakage mass flow rate and level of tip and casing interactions. In the compressor section, interactions of tip leakage flow with the mainstream flow and other secondary flows can lead to decreased efficiency and negatively impact compressor stability. In some examples, tip flow leakage can result in compressor and/or fan instabilities such as stall and surge. Compressor and/or fan stall is a circumstance of abnormal airflow resulting from the aerodynamic stall of the rotor blades within the respective component, which causes the air flowing through the component to slow down or stagnate. Compressor and/or fan surge refers to a stall that results in the disruption (e.g., complete disruption, partial disruption, etc.) of the airflow through the respective component.

Based on the foregoing, at least one factor that determines performance of a turbine engine is tip clearance associated with a fan and/or a compressor. Typically, turbine engine performance increases with a smaller tip clearance to minimize air loss or leakage around the blade tip. If close tip clearances are not maintained, a loss of performance will be noticed in pressure capability and airflow. However, tip clearance that is too small (e.g., resulting in blade tip rubbing) can result in damage to the casing, the blade, and/or another component of the turbine engine. Thus, an ability to control (e.g., manage) tip clearance during operation of a turbine engine can be important for aerodynamic performance of a turbine engine.

Examples disclosed herein enable manufacturing of an example variable flowpath casing having a variable flowpath component that provides for blade-tip-to-case clearance control. Example variable flowpath casings disclosed herein include an example outer substrate that surrounds an example variable flowpath component. The variable flowpath component (e.g., a flexible casing flowpath above a blade tip) can be used to control blade-tip-to-case clearance by adjusting a casing flowpath surface during operation. Controlled tip clearance between a rotor blade and a casing can be a challenge due to differential thermal expansion of the rotor blade(s) material and casing material. Certain examples disclosed herein provide a material independent, system level architecture for blade tip clearance control that can be used for different blade and casing material combinations.

Example variable flowpath components disclosed herein include an example inner substrate, a diameter of which can be adjusted (e.g., during operation of a turbine engine) to move a surface of the variable flowpath casing, and an example tension (e.g., pressure) element (e.g., component), which is a belt-type structure, to adjust the inner substrate diameter. In some examples, the inner substrate is an annular substrate that includes a plurality of partial splits spaced circumferentially around the annular substrate and extending in an axial direction. The partial splits in the annular substrate generate a plurality of inner substrate regions that can be moved to adjust a diameter of the inner substrate (e.g., differentially along the axial direction). For example, the partial splits can begin near a leading edge of a corresponding array of rotor blades and extend axially towards a trailing edge of the corresponding array of rotor blades. The tension component can extend circumferentially around a periphery of the inner substrate regions. The tension component can be, for example, a wire, a belt, and/or another structure that can apply pressure circumferentially at an axial position of the inner substrate to adjust a diameter of the inner substrate. The tension component(s) around the inner substrate can be tensioned and/or loosened to achieve a desired casing diameter and, thus, a desired tip clearance.

In some examples, an example inner substrate of an example variable flowpath casing can be defined by a plurality of inner substrate segments (e.g., sections, regions, portions, etc.) that extend in an axial direction. In some such examples, adjacent inner substrate segments can be slidably coupled to one another at example junctions. For example, the inner substrate segments can be coupled via joints that allow adjacent inner substrate segments to move in a radial direction relative to one another. In some examples, the inner substrate segments can slide along the example joints up to certain defined lengths to help prevent the inner substrate segments from separating. In some examples, a tension component(s) can be positioned within a channel(s) of an inner substrate(s) region that runs circumferent inside the inner substrate segment(s). The tension component(s) within the inner substrate segment(s) can be tensioned and/or loosened to achieve a desired casing diameter and, thus, a desired tip clearance.

In some examples, the tension component can be pretensioned to maintain the inner substrate regions circumferentially at a defined position (e.g., close to each other). The tension component can be actuated to pull the inner substrate regions and/or segments radially inwards (e.g., to reduce tip clearance) and/or released to allow the inner substrate regions and/or segments to move radially outwards (e.g., to increase a diameter of the inner substrate and adjust tip clearance). In some examples, a variable flowpath component can be actively and/or passively controlled.

Certain example variable flowpath components can be actively controlled (e.g., actuated). For example, based on a proximity sensor reading of tip clearance between the rotor blade tips and the variable flowpath casing, a controller (e.g., a full-authority digital engine control (FADEC) system, electric controller, etc.) can actuate an example tension component to increase and/or decrease tip clearance to mitigate an active tip clearance. For example, a proximity sensor can be positioned on an example variable flow casing at a blade tip region to identify real time tip clearance and communicate with a FADEC system to maintain a desired tip clearance. When tip clearance is outside a defined range of acceptable values, the controller can actuate an example tension component.

Certain example variable flowpath components can be passively controlled. Certain example tensioning elements can be actuated based on a temperature of ambient air and/or other ambient stimuli. For example, the ambient air can be used to cool and/or heat a material (e.g., a smart memory alloy (SMA), a bi-metallic material, a high-alpha material, etc.) to cause an example tension component to adjust a diameter of an example variable flowpath component surface to mitigate an active tip clearance.

Examples disclosed herein can be used to prevent blade tip rubs on a variable flow casing, thus reducing the chances of rotor blade tip and/or casing abradable material damage or destruction. Certain examples reduce costs (e.g., maintenance costs) of rotor blades due to tip loss and casing abradable repair. As fan casing sizes grow with growing fan sizes, examples disclosed herein can reduce manufacturing, assembly, and/or maintenance efforts.

Certain example variable flowpath components include a honeycomb structure and/or a damper. Certain examples can thus serve a dual purpose by also acting as a compliant structure to absorb more energy and withstand increased impact load during a blade-out event. A blade-out event refers to an unintentional release of a rotor blade during operation. Structural loading can result from an impact of the rotor blade on a casing (e.g., shroud) and from the subsequent unbalance of the rotating components. Certain examples can thus reduce damage to a variable flowpath casing (e.g., for a fan, compressor, etc.) under an impact load.

Examples disclosed herein are discussed in connection with a variable flowpath casing for a fan section (e.g. single stage fans, multi-stage fans, etc.) of a turbine engine. It is understood that examples disclosed herein for the variable flowpath casing having the variable flowpath component may additionally or alternatively be applied to other sections of the turbine engine, including a compressor section and turbine section. Though examples disclosed herein are discussed in connection with a turbofan jet engine, it is understood that examples disclosed herein can be implemented in connection with a turbojet jet engine, a turboprop jet engine, a combustion turbine for power production, or any other suitable application.

Referring now to the drawings, wherein identical numerals indicate the same elements throughout the figures, FIG. 1 is a schematic cross-sectional view of an example high-bypass turbofan-type gas turbine engine 100. While the illustrated example is a high-bypass turbofan engine, the principles of the present disclosure are also applicable to other types of engines, such as low-bypass turbofans, turbojets, turboprops, etc. As shown in FIG. 1, the turbine engine 100 defines a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outwardly from the centerline axis 102, and the circumferential direction C is a direction that extends concentrically around the centerline axis 102.

In general, the turbine engine 100 includes a core turbine or gas turbine engine 104 disposed downstream from a fan (e.g., fan section) 106. The core turbine 104 includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 can also couple to a fan spool or shaft 128 of the fan 106. In some examples, the LP shaft 126 is coupled directly to the fan shaft 128 (e.g., a direct-drive configuration). In alternative configurations, the LP shaft 126 can couple to the fan shaft 128 via a reduction gear 130 (e.g., an indirect-drive or geared-drive configuration).

As shown in FIG. 1, the fan 106 includes a plurality of fan blades 132 coupled to and extending radially outwardly from the fan shaft 128. An annular fan casing or nacelle 134 circumferentially encloses the fan 106 and/or at least a portion of the core turbine 104. The nacelle 134 can be supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbine engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where the air 158 mixes with fuel and bums to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof. A turbine frame 170 with a fairing assembly is located between the HP turbine 118 and the LP turbine 120. The turbine frame 170 acts as a supporting structure, connecting a high-pressure shaft's rear bearing with the turbine housing and forming an aerodynamic transition duct between the HP turbine 118 and the LP turbine 120. Fairings form a flow path between the high-pressure and low-pressure turbines and can be formed using metallic castings (e.g., nickel-based cast metallic alloys, etc.).

Along with the turbine engine 100, the core turbine 104 serves a similar purpose and is exposed to a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gear 130) can be included between any shafts and spools. For example, the reduction gear 130 is disposed between the LP shaft 126 and the fan shaft 128 of the fan 106.

As described above with respect to FIG. 1, the turbine frame 170 is located between the HP turbine 118 and the LP turbine 120 to connect the high-pressure shaft's rear bearing with the turbine housing and form an aerodynamic transition duct between the HP turbine 118 and the LP turbine 120. As such, air flows through the turbine frame 170 between the HP turbine 118 and the LP turbine 120.

Figure 2:
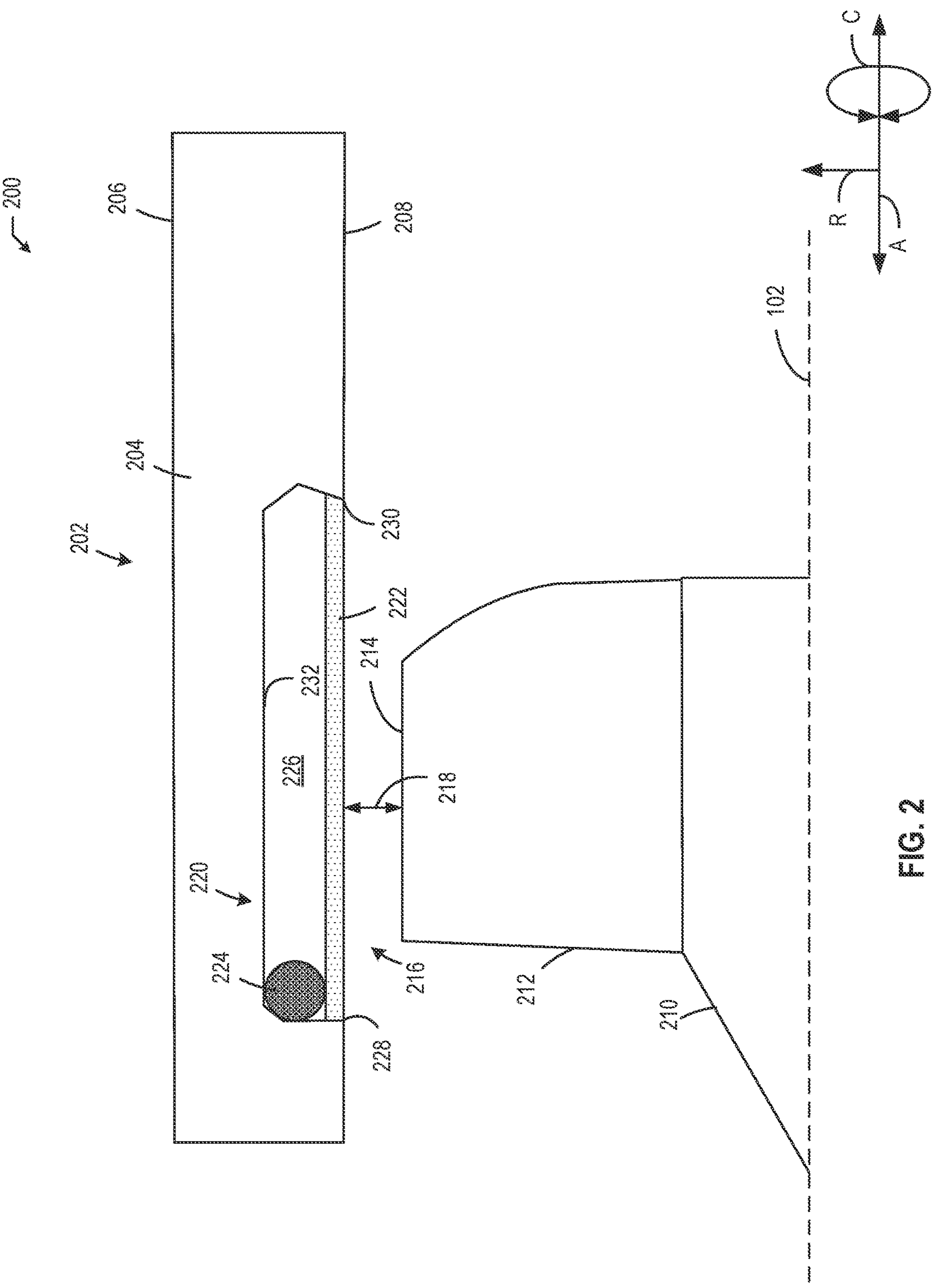
FIG. 2 is a partial cross-sectional view of an example fan including an example variable flowpath casing constructed in accordance with the teachings of this disclosure.

FIG. 2 is a schematic cross-sectional illustration of an example fan 200 of an example turbine engine (e.g., turbine engine 100 of FIG. 1) above an axial centerline (e.g., centerline axis 102), including an example variable flowpath casing 202 constructed in accordance with the teachings of this disclosure. The variable flowpath casing 202 defines at least one flowpath for air that flows through the turbine engine 100. The variable flowpath casing 202 includes an example first (e.g., outer) substrate 204, which is an annular substrate that extends along an axial direction to surround and/or house the fan 200. The outer substrate 204 has a thickness defined by a distance from an outer surface 206 of the outer substrate 204 towards in inner surface 208 of the outer substrate 204. In some examples, the inner surface 208 changes radius along the axial direction, sloping radially inward along the axial direction. In additional or alternative examples, the inner surface 208 may slope radially outward along the axial direction and/or may maintain a constant radius along the axial direction. In some examples, the outer substrate 204 implements first substrate means.

The fan 200 of FIG. 2 includes an example shaft 210 and an example rotor blade(s) 212. While one rotor blade 212 is illustrated as an example in FIG. 2, the fan 200 includes an array of rotor blades 212 that are spaced circumferentially around the shaft 210, extending radially outwards towards the variable flowpath casing 202. The rotor blade(s) 212 includes an example blade tip 214 at a radially outward portion of the rotor blade 212. In operation, the rotor blades 212 spin in a circumferential direction to impel air downstream. The variable flowpath casing 202 circumferentially surrounds the rotor blades 212.

An example blade tip region 216 of the variable flowpath casing 202 is illustrated at a region of the variable flowpath casing 202 at the blade tip 214. The blade tip region 216 is associated with an example tip clearance 218, defined by a distance between the blade tip 214 and the blade tip region 216 of the variable flowpath casing 202. During operation of the turbine engine 100, the variable flowpath casing 202 experiences loads that influence the tip region(s) 216 and more specifically, the tip clearance 218. For example, the tip clearance 218 between the blade tip 214 and the tip region 216 of the variable flowpath casing 202 can transition between a relatively large clearance and relatively small clearance. In some examples, a relatively large clearance may be between 4% to 10% of the axial cord. A relatively small (e.g., substantially non-existent) clearance can allow the blade tip 214 to rub against the blade tip region 216 of the variable flowpath casing 202. Further, the changes in tip clearance 218 may affect the airflow through the turbine engine 100 resulting in performance losses and/or stalls (e.g., fan stall, compressor stall, etc.) by allowing air to bypass the rotor blades 212. Accordingly, the variable flowpath casing 202 includes an example variable flowpath component (e.g., mechanism, surface, ring, system, etc.) 220 structured in accordance with the teachings of this disclosure to control blade-tip-to-casing clearance. The variable flowpath component 220 implements an example variable flowpath surface that can adjust with rotor and/or casing changes during operation to increase performance of a fan 106, 200, a compressor section, and/or, more generally, the turbine engine 100.

The variable flowpath component 220 of FIG. 2 includes an example inner substrate 222, which implements the variable flowpath surface of the variable flowpath casing 202, and an example tension component 224. In some examples, the inner substrate 204 implements second substrate means. In some examples, the tension component 224 implements tensioning means. The variable flowpath component 220 of FIG. 2 resides at least partially within an example trench (e.g., cavity, opening, etc.) 226 of the outer substrate 204. The example trench 226 is at the tip region 216 of the variable flowpath casing 202. The example trench 226 extends axially from a forward end 228 of the trench 226 (e.g., positioned forward of a rotor blade 212) towards an aft end 230 of the trench 226 (e.g., positioned aft of the rotor blade 212). The trench 226 includes a depth that extends from the inner surface 208 of the outer substrate 204, radially inwards towards an example trench ceiling 232 (e.g., between the inner surface 208 and the outer surface 206 of the outer substrate 204). In some examples, the variable flowpath casing 202 includes more than one trench 226. For example, the variable flowpath casing 202 can include an additional or alternative trench(es) 226 at another tip region of the fan 200 and/or at a tip region(s) of an array(s) of compressor rotor blades. In some examples, a portion of the outer substrate 204 can include a facesheet, a honeycomb layer, and/or other component(s) that provide structure, damping, etc.

In operation, at least a portion of the inner substrate 222 is structured to move radially inwards to reduce a tip clearance 218 and/or radially outwards to increase a tip clearance 218 (e.g., to prevent tip rubbing of the blade tip 214 and variable flowpath casing 202). For example, the inner substrate 222 can be moved by the example tension component 224. The tension component 224 is an annular substrate that extends circumferentially around and/or within the inner substrate 222 (e.g., in a channel(s)). The tension component 224 can be tensioned (e.g., tightened, tensed, pulled tight, etc.) to pull the inner substrate 222 radially inwards towards the blade tip(s) 214. For example, the tension component 224 can be tensioned in response to a relatively large tip clearance 218. Further, the tension component 224 can be loosened to move the inner substrate 222 radially outwards away from the blade tip 214. For example, the tension component 224 can be loosened (e.g., slacked, released, etc.) in response to a relatively small tip clearance 218 to prevent tip rubbing.

In some examples, the variable flowpath component 220 and/or the turbine engine 100 includes an example clearance control system (discussed in relation to FIG. 10) to detect and/or actuate the tension component 224. The clearance control system can include, at least, a sensor to detect tip clearance 218, a controller to monitor tip clearance 218 at a tip region 216, and/or a controller and/or actuator to cause the tension component 224 to tighten and/or loosen. For example, the controller may identify a relatively large and/or a relatively small tip clearance 218. The controller may be a human and/or monitoring circuitry controlled by an electronic compute device such a computer. In response to identifying the relatively large and/or the relatively small tip clearance 218, the controller may be structured to actuate the tension component 224 to increase a diameter of the inner substrate 222 and/or decrease a diameter of the inner substrate 222 to adjust the tip clearance 218. In some examples, a relatively small tip clearance 218 is a tip clearance smaller than approximately 20 mils. In some examples, a relatively large tip clearance 218 is a tip clearance larger than approximately 40 mils. For example, the controller may cause an actuator to tighten the tension component 224 to decrease a diameter of the inner substrate 222 to decrease the tip clearance 218. Similarly, the controller may cause an actuator to loosen the tension component 224 to increase a diameter of the inner substrate 222 to increase the tip clearance 218.

Additional or alternative variable flowpath components for an example variable flowpath casing(s) 202 are described in further detail below. The example variable flowpath components disclosed below are applied to the example turbine engine 100 of FIGS. 1-2. As such, the details of the parts (e.g., blade tip 214, tip region 216, tip clearance 218, outer substrate 204, trench 226, etc.) are not repeated in connection with FIGS. 3A-12. Further, the same reference numbers used for the structures shown in FIG. 2 are used for similar or identical structures in FIGS. 3A-12. Examples disclosed below are applied to the example fan 200 of the example turbine engine 100 as described in FIGS. 1-2. It is understood, however, that examples disclosed herein may be implemented in additional or alternative fans. Further, examples disclosed herein may be implemented in one or more core engine casings, such as at a compressor section, turbine section, etc. Further, examples disclosed herein may be applied to a variety of turbine engines, such as a multi-spool turbine engine, a turboshaft engine, turbine engines with one compressor section, etc.

Figure 3A:
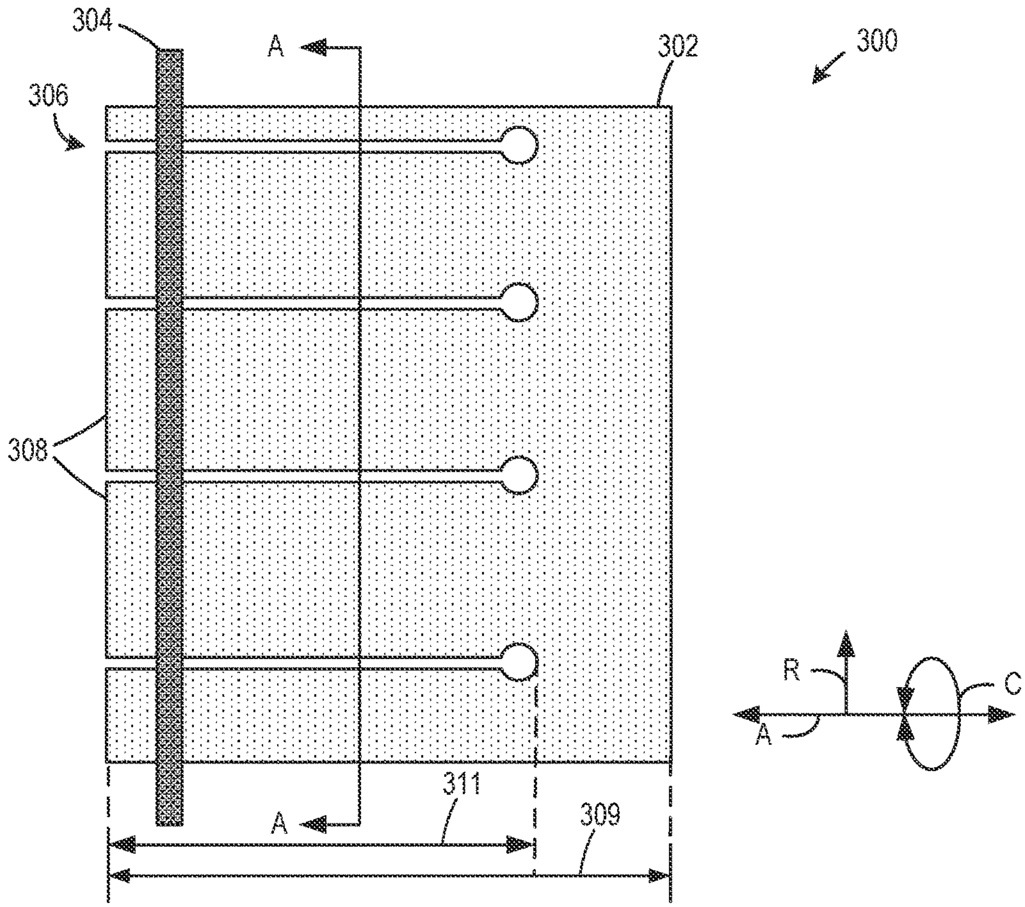
FIG. 3A is a schematic illustration of an axial view of an example variable flowpath component constructed in accordance with the teachings of this disclosure.

FIG. 3A is an axial view of an example variable flowpath component 300 constructed in accordance with the teachings of this disclosure. The example variable flowpath component 300 can positioned within an example trench (e.g., trench 226) of an example outer substrate 204 of an example variable flowpath casing 202. The example variable flowpath component 300 includes an example inner substrate 302 and an example tension component 304. In some examples, the tension component 224 implements tensioning means. The example inner substrate 302 is an annular substrate than extends around and encloses rotor blades (e.g., fan blades 132, rotor blades 212, compressor blades, etc.) of the turbine engine 100. In some examples, the inner substrate 204 implements second substrate means. The inner substrate 302 of FIG. 3A includes a plurality of partial splits 306 extend in the axial direction to generate a plurality of inner substrate regions 308 of the inner substrate 302 (e.g., similar to a collet-type structure), which includes a length 309. In some examples, the length 309 is larger than a length of the trench. The partial splits 306 are spaced circumferentially about the inner substrate 302. In some examples, the partial splits 306 are substantially equally spaced apart in the circumferential direction. However, the partial splits 306 can be spaced differently in additional or alternative examples. In some examples, the partial splits 306 extend a distance (e.g., length) 311 that is less than the length 309 of the inner substrate 302. In some examples, the partial splits 306 extend a distance (e.g., length) 311 substantially equal to the length of the trench 226. However, the partial splits 306 can be longer or shorter in additional or alternative examples.

Figure 3B:
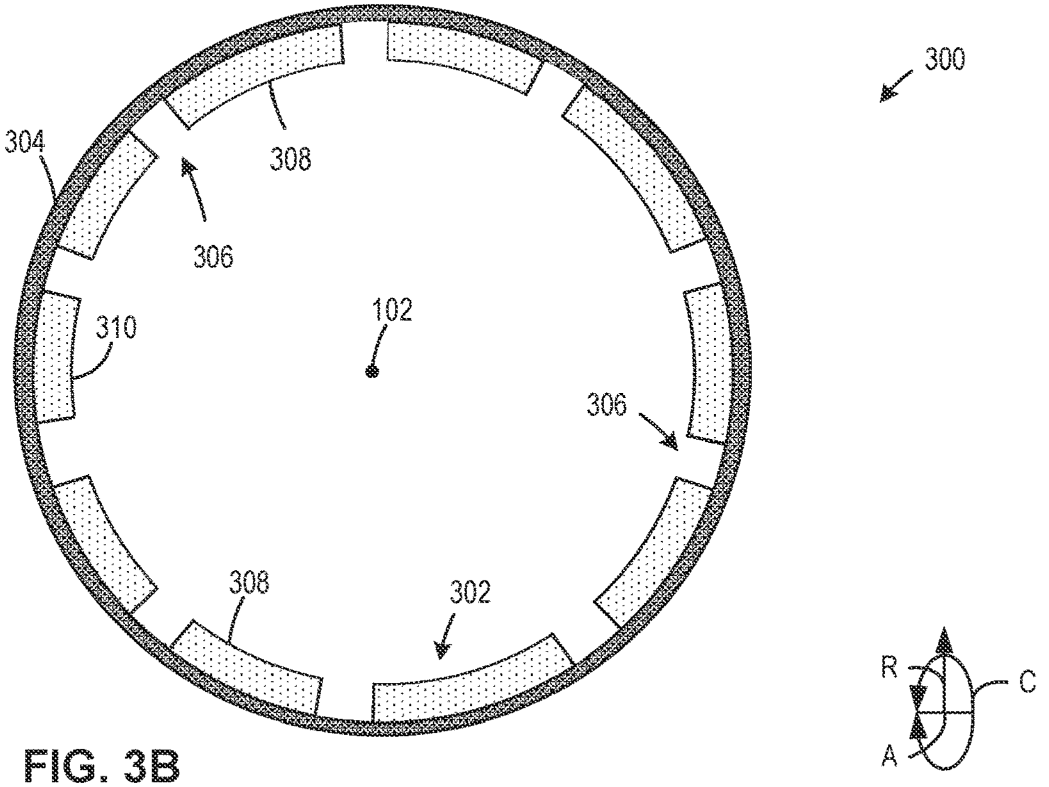
FIG. 3B is a circumferential cross-sectional view of the example variable flowpath component of FIG. 3A along a line A-A in accordance with the teachings of this disclosure.

FIG. 3B is a circumferential view of the variable flowpath component 300 of FIG. 3A along a line A-A. As illustrated in FIG. 3B, the example tension component 304 of FIG. 3A extends circumferentially around a periphery of the inner substrate 302. In some examples, the tension component 304 is pre-tensioned to hold the inner substrate regions 308 of the inner substrate 302 circumferentially at a first position. For example, the first position can be such that an inner surface 310 of the inner substrate 302 is substantially flush with an inner surface (e.g., inner surface 208) of the outer substrate 204 of the variable flowpath casing 202. In some examples, the tension component 304 can be pre-tensioned based on a tip clearance 218 that is predicted via a benchmarked database and/or a gap detection sensor.

In some examples, the tension component 304 is actively controlled. For example, the tension component 304 can be a wire made of an example shape-memory alloy (SMA). A shape memory alloy is a material that can be readily deformed by applying an external force and will recover to its original form upon application of a thermal or mechanical force. For example, the tension component 304 made of a SMA can be deformed by applying heat to the tension component 304 (e.g., by passing current through the SMA). For example, the tension component 304 can be tensioned by applying a load to the wire to induce tension along its length and, in this process, we produce an increase in strain and stress.

In some examples, the tension component 304 is passively controlled. For example, the tension component 304 can be a wire made of a bi-metallic material that responds passively to ambient changes in temperature. A bi-metallic material is a material that includes two separate metals joined together. Whereas an alloy is a mixture of two or more materials, the bi-metallic material includes layers of different metals. The bi-metallic material can convert a temperature change into a mechanical displacement. For example, the bi-metallic material can include two different materials that expand at different rates as they are heated. Thus, the different expansions can cause the tension component 304 to bend a first way upon an increase in the ambient temperature. Further, the tension component 304 can be caused to bend a second (e.g., opposite) way upon a decrease in the ambient temperature.

FIGS. 4A-4C are schematic illustrations of the example variable flowpath casing 202 with the example variable flowpath component 300 of FIGS. 3A and 3B in different positions in accordance with the teachings of this disclosure. Specifically, FIG. 4A illustrates the variable flowpath component 300 in an example first position 402. The first position 402 can be, for example, a resting position of the variable flowpath component 300 (e.g., a starting position). The variable flowpath component 300 can be in the first position 402 upon start-up of the turbine engine 100.

As illustrated in FIG. 4A, an example first end 404 of the inner substrate 302 is coupled to a forward end 228 of the trench 226 of the outer substrate 204. Similarly, an example second end 406 of the inner substrate 302 is coupled to an aft end 230 of the trench of the outer substrate 204. In some examples, the second end 406 of the inner substrate 302 is coupled to the outer substrate 204, while the first end 404 of the inner substrate 302 is free from the outer substrate 204. In some examples, the inner substrate 302 is a separate component from the outer substrate 204 that is fastened or otherwise coupled to the outer substrate 204. In some examples, the inner substrate 302 and the outer substrate 204 a single component. For example, the inner substrate 302 and the outer substrate 204 can be formed as a single casing piece via an additive manufacturing process and/or a substrative manufacturing process.

FIG. 4B illustrates example motion of the variable flowpath component 300. That is, FIG. 4B illustrates a direction of motion of the tension component 304 that causes the inner substrate 302 to move in an example first direction 408. For example, the variable flowpath component 300 is illustrated in the first position 402. From the first position 402, the tension component 304 can be pulled in (e.g., via a current, change in ambient temperature, a mechanical stringer (discussed below in relation to FIGS. 9A and 9B), etc.) such that the variable flowpath component 300 is in an example second position 410 to adjust the tip clearance 218. The tension component 304 pulling radially inwards causes the inner substrate 302 to move radially inwards, reducing the tip clearance 218 between a blade (e.g., rotor blade 212 and/or another blade) and the variable flowpath casing 202.

FIG. 4C illustrates the variable flowpath component 300 in the second position 410. The inner substrate 302 includes the plurality of inner substrate regions 308. The pulling of the tension component 304 on the inner substrate 302 causes the inner substrate regions 308 of the inner substrate 302 to move radially inwards. Thus, FIG. 4C illustrates an example inner substrate region 308 in the second (e.g., radially inward) position 410.

FIG. 4B also illustrates a direction of motion of the tension component 304 that causes the inner substrate 302 to move in an example second direction 412. For example, the tension component 304 can be loosened (e.g., via a current, change in ambient temperature, the mechanical stringer, etc.) to adjust the tip clearance 218. By loosening the tension component 304, the tension component 304 is caused to move radially outwards, causing the substrate regions 308 of the inner substrate 302 to move radially outwards towards the first position 402. The radially outwards movement of the inner substrate 302 increases the tip clearance 218 between a rotor blade 212 and the variable flowpath casing 202.

FIG. 5 is a schematic illustration of another example variable flowpath component 500 constructed in accordance with the teachings of this disclosure. The example variable flowpath component 500 of FIG. 5 is similar to the variable flowpath component 300 of FIGS. 3A-4C. As such, the variable flowpath component 500 includes the example inner substrate 302 and the example tension component 304, which can be positioned within the example trench 226 of the example variable flowpath casing 202. However, the variable flowpath component 500 of FIG. 5 includes an example honeycomb layer 502 and an example viscoelastic layer (e.g., damper) 504 positioned within the trench 226. The honeycomb layer 502 of FIG. 5 is positioned between the trench ceiling 232 and the damper 504. The honeycomb layer 502 provides energy absorption capabilities by dampening vibrations.

The damper 504 can provide dampening capabilities. In the illustrated example of FIG. 5, the damper 504 is positioned between the honeycomb layer 502 and the inner substrate 302. Thus, the damper 504, which is sandwiched between the honeycomb layer 502 and the inner substrate 302, can trap and/or dissipate vibrations made on either side of the damper 504. For example, the damper 504 can reduce vibrations that transfer to the variable flowpath casing 202 from pressures of the rotor blades 212. In some examples, the damper 504 absorbs impactors from the rotor blades 212 before impactors (e.g., blade-out events, etc.) are transmitted to directly onto the outer substrate 204. As such, the variable flowpath component 500 of FIG. 5 serves a dual purpose by acting as a compliant structure to absorb more energy and withstand higher impact load during a blade-out event.

FIG. 6 is a schematic illustration of another example variable flowpath component 600 constructed in accordance with the teachings of this disclosure. The variable flowpath component 600 of FIG. 6 is similar to the variable flowpath component 220, 300, 500 of the FIGS. 2-5. However, the variable flowpath component 600 of FIG. 6 includes multiple tensioning components. Specifically, the variable flowpath component 600 includes a first tension component 602, a second tension component 604, and a third tension component 606. The tension components 602, 604, 606 can be different formed with materials that operate at different temperatures. For example, the first tension component 602 can be formed of a first material that operates at a first temperature to reduce a diameter of the inner substrate 302 a first distance. In some examples, the first tension component 602 implements tensioning means. In some examples, the second tension component 604 can be formed of a second material operates at a second temperature to reduce a diameter of the inner substrate 302 a second distance that is less than the first distance. In some examples, the second tension component 604 implements tensioning means. In some examples, the third tension component 606 can be formed of a third material operates at a third temperature to reduce a diameter of the inner substrate 302 a third distance that is less than the first distance and the second distance. In some examples, the third tension component 606 implements tensioning means.

In some examples, the variable flowpath component 600 can include more or fewer tension components 602, 604, 606. In some examples, one or more of the tension components 602, 604, 606 can be the same material. In some examples, the tension components 602, 604, 606 can be positioned within a channel(s) of the inner substrate 302 (e.g., as discussed below in relation to FIGS. 8A and 8B).

Figure 7:
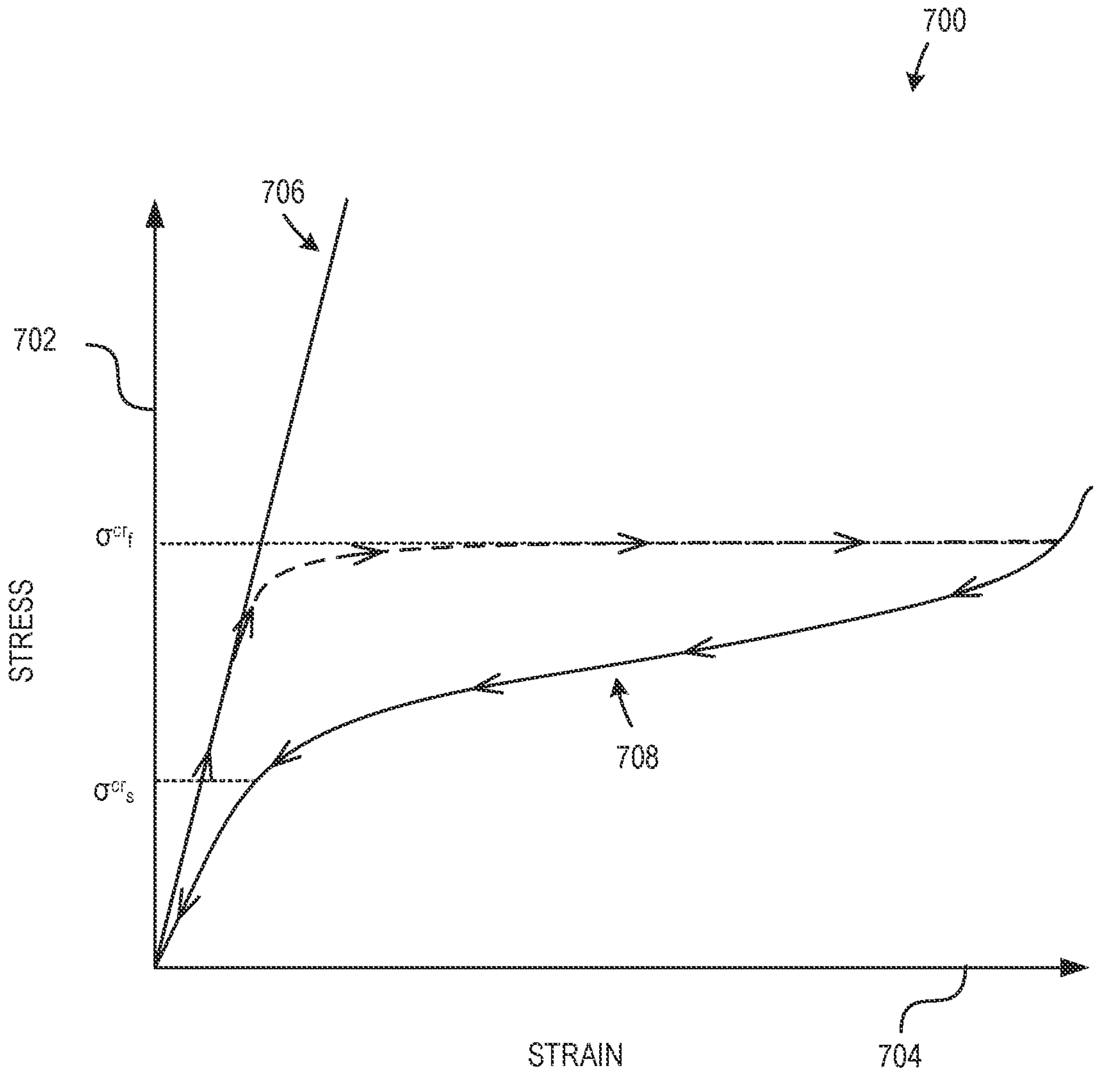
FIG. 7 is an illustration of an example stress-strain diagram.

FIG. 7 is an illustration of an example stress-strain diagram 700. Mechanical properties of materials are often examined by means of stress-strain (e.g., load-deformation) behavior. Accordingly, the stress-strain diagram 700 can be used to identify mechanical properties of variable flowpath components 300, 500, 600 800 disclosed herein. The stress-strain diagram 700 of FIG. 7 can represent an example SMA. The stress-strain diagram 700 includes stress on an example Y-axis 702 and strain measurements on an example X-axis 704.

Depending on a temperature and a stress applied to a material, an SMA can take on two state phases, including an austenite phase and a martensite phase. The stress-strain diagram 700 includes an example austenite boundary 706 and an example martensite boundary 708. The austenite phase, which is associated with specific macroscopic shape, is a stronger phase occurring at a higher temperature. As stress is applied to a material, the material can transform into the martensite phase in which deformation can occur at a macroscopic scale. As compared to the austenitic phase, the martensitic phase is soft. The martensitic phase occurs at lower temperatures and can be easily deformed. The material in the martensite phase can exhibit different macroscopic shapes according to the amount and direction of the induced deformation strain (e.g., referred to as detwinning). After removing the stress, heating the material can cause the material to transform from the martensite phase to the austenite phase, which causes the material to recover to its original shape (e.g., geometry). That is, material in the austenite phase retains memory and "remembers" pre-deformation shape. The austenite boundary 706 and the martensite boundary 708 can differ for a SMA depending on an amount of pre-load tension in a tensioning component, a number of tensioning components, a length of a tensioning component, a temperature, and/or an amount of clearance.

Figure 8A:
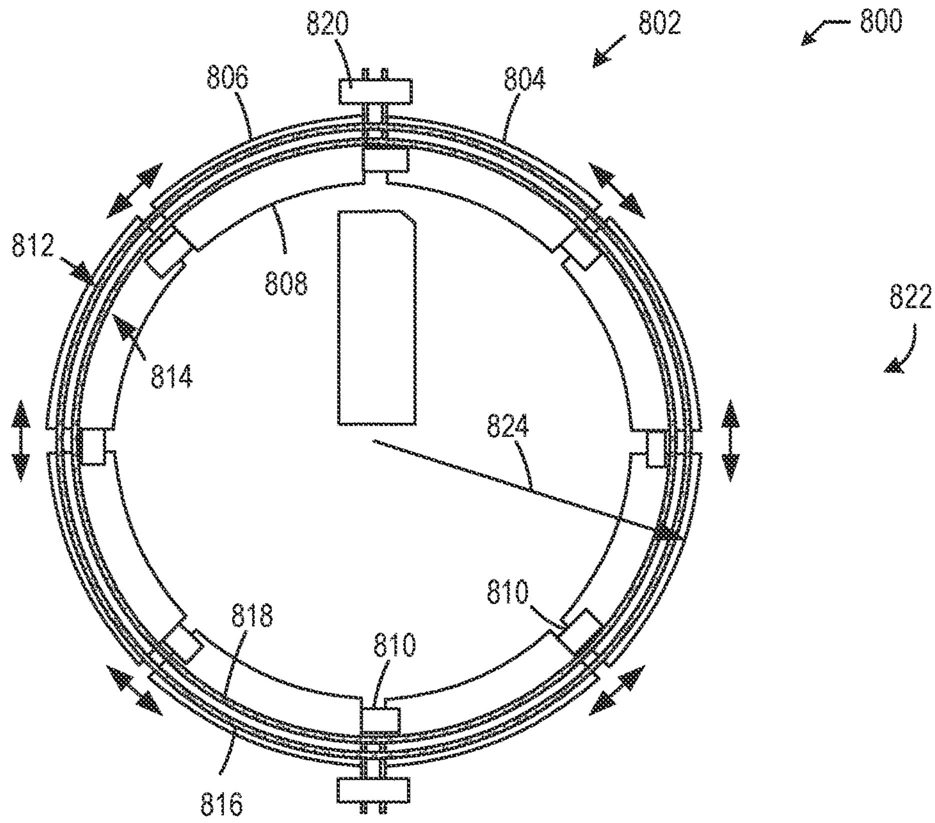
FIG. 8A is schematic illustration of a circumferential cross-sectional view of another example variable flowpath component for a variable flowpath casing structured in accordance with the teachings of this disclosure.
Figure 8B:
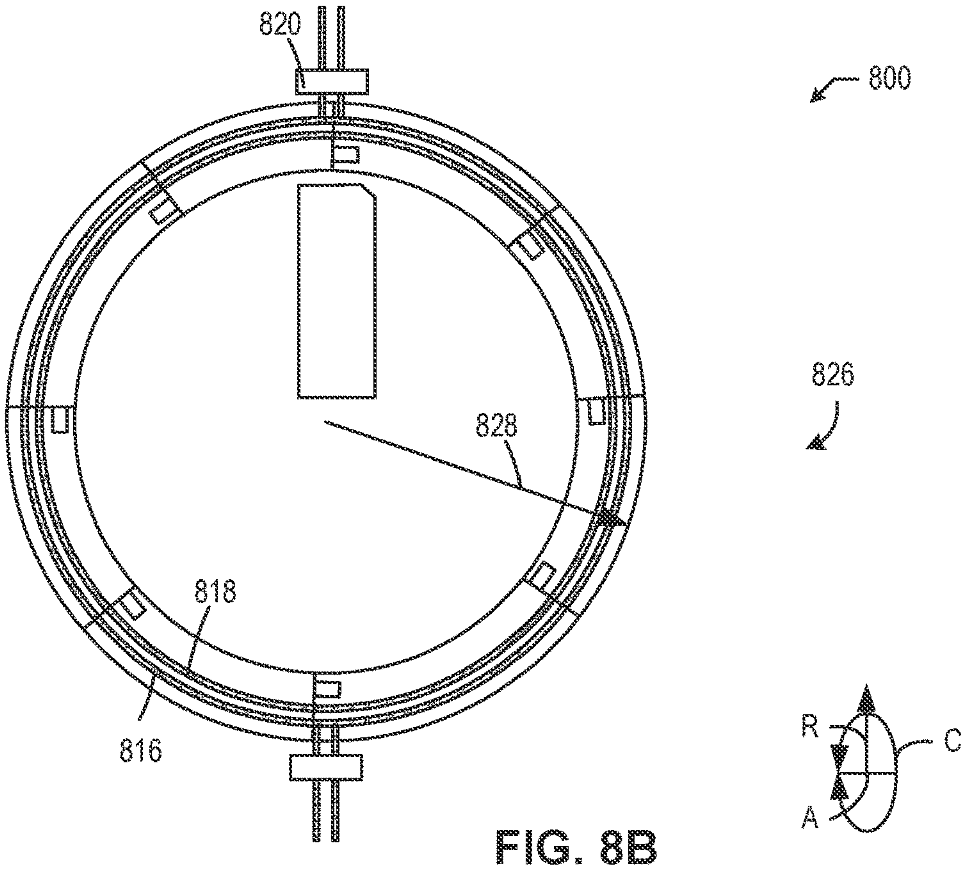
FIG. 8B is schematic illustration of a circumferential cross-sectional view of the example variable flowpath component of FIG. 8A in another position in accordance with the teachings of this disclosure.

FIGS. 8A and 8B are circumferential cross-sectional views of another example variable flowpath component 800 in different positions in accordance with the teachings of this disclosure. As illustrated in FIG. 8A, the variable flowpath component 800 includes an example inner substrate 802 that is segmented into a plurality of inner substrate regions 804. In some examples, the inner substrate 802 implements second substrate means. The inner substrate regions 804 are spaced circumferentially about rotor blades (e.g., rotor blades 212, etc.) of the turbine engine 100. The inner substrate regions 804 extend along an axial direction.

In some examples, the inner substrate regions 804 include a honeycomb structure. The inner substrate regions 804 are defined by a thickness that extends from an example first (e.g., outer) annular surface 806 radially inwards towards an example second (e.g., inner) annular surface 808. In some examples, the inner substrate regions 804 include an example layer of abradable material at the second annular surface 808. The abradable material can be at least one layer of an abradable material (e.g., rubber, nickel-aluminum, etc.) applied to a radially inward surface of the inner substrate regions 804.

Adjacent inner substrate regions 804 are slidably coupled to one another at example junctions 810. In some examples, the junction(s) 810 implement junction means. The example junctions 810 allow the inner substrate regions 804 to slide relative to one another within a defined range of distance. For example, the junctions 810 allow the inner substrate regions 804 to slide apart (e.g., to increase a diameter of the inner substrate 802) up to a certain length to prevent the inner substrate regions 804 from separating on increase of diameter.

In the illustrated example of FIG. 8A, each inner substrate region 804 includes an example first channel 812 and an example second channel 814 (e.g., positioned radially inward from the first channel 812). The channels 812, 814 are positioned between the inner annular surfaces 808 and the outer annular surfaces 806. The inner substrate regions 804 can include one or more than two channel 812, 814 in additional or alternative examples. An example first tension component 816 is positioned with the first example channel 812. Similarly, an example second tension component 818 is positioned within the second channel 814.

The variable flowpath component 800 of FIG. 8A includes an example tensioner 820. The first tension component 816 and the second tension component 818 are operatively coupled to the example tensioner (e.g., actuator, etc.) 820. In some examples, the first tension component 816 and/or the second tension component 818 implement tensioning means. The tensioner 820 is structured to pull the tension components 816, 818 to cause the tension components 816, 818 to reduce in diameter. The reduction in diameter of the tension components 816, 818 causes the inner substrate regions 804 to move radially inwards to reduce a diameter of the inner substrate 802 and reduce a tip clearance 218. The tensioner 820 is structure to release the tension components 816, 818 cause the tension components 816, 818 to increase in diameter. The increase in diameter of the tension components 816, 818 causes the inner substrate regions 804 to move radially outwards to increase a diameter of the inner substrate 802 and increase the tip clearance 218. Accordingly, the tensioner 820 can tighten and/or loosen the tension components 816, 818 to achieve a desired diameter of the inner substrate 802 and thus, the tip clearance 218.

FIG. 8A illustrates the variable flowpath component 800 at an example first position 822 associated with an example first diameter 824. For example, the first position 822 can be a resting position and the first diameter 824 can be a diameter at which the inner annular surfaces 808 are substantially flush with an inner surface 208 of the outer substrate 204.

FIG. 8B illustrates the variable flowpath component 800 at an example second position 826 associated with an example second diameter 828, which is smaller than the first diameter 824 of FIG. 8A. For example, in response to a relatively large tip clearance 218, the tensioner 820 pulled the tension components 816, 818 to decrease the diameter of the tension components 816, 818 and, in turn, achieve the second diameter 828 to reduce the tip clearance 218. In response to a relatively small tip clearance 218, the tensioner 820 can release the tension components 816, 818 to increase the diameter of the tension components 816, 818 and, in turn, achieve the first diameter 824 to increase the tip clearance 218. However, the tensioner 820 can cause the tension components 816, 818 and/or the inner substrate 802 to achieve other diameters in additional or alternative examples.

Figure 9A:
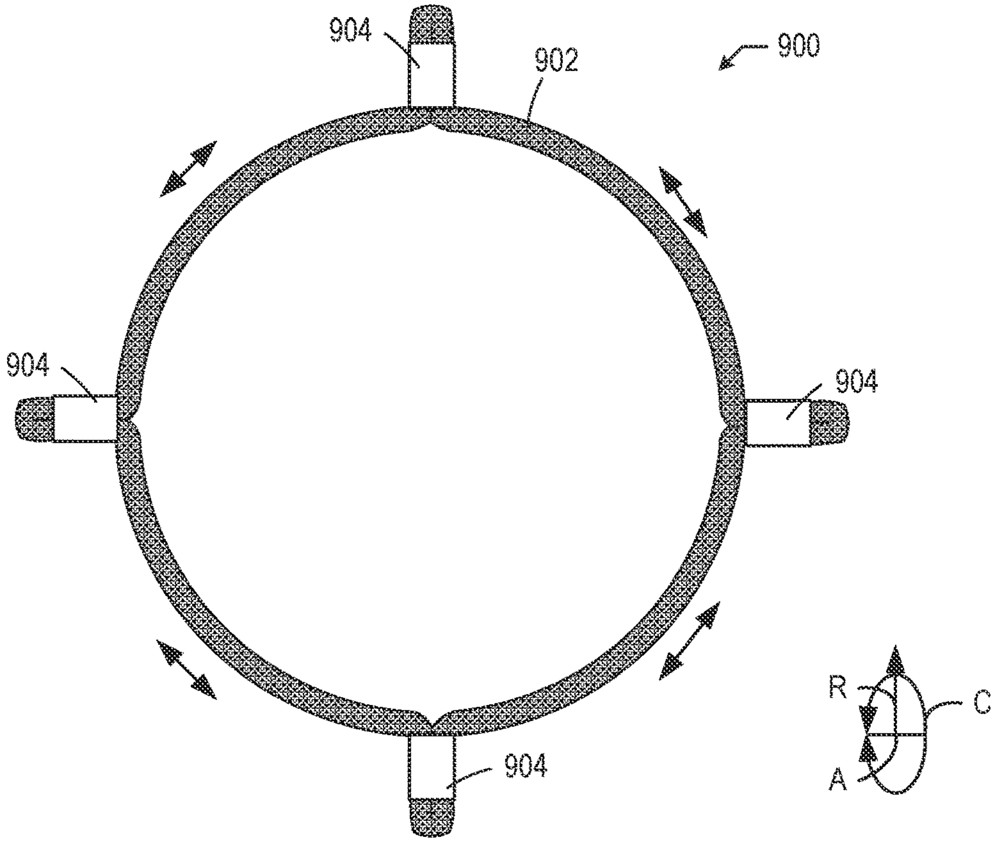
FIG. 9A is an illustration of an example tension component that can be applied to variable flowpath components constructed in accordance with the teachings of this disclosure.

FIG. 9A is an illustration of another example tension component 900 that can be applied to variable flowpath components 300, 500, 600 800 constructed in accordance with the teachings of this disclosure. For example, the tension component 900 can be positioned around a periphery of an inner substrate 304, positioned within a channel(s) 812, 814, etc. In some examples, the tension component 900 implements tensioning means. The tension component 900 of FIG. 9 enables variable tip clearance 218 control based on selective actuation of the tension component 900. The tension component 900 includes an example wire 902. The wire 902 of FIG. 9 is a single wire, but can be a segmented wire in additional or alternative examples. The tension component 900 includes example tensioners 904, which are mechanical stringers (e.g., wire tensioners). For example, the tensioner 904 can be a combination of a wire tensioner and a clamp, a machine head (e.g., a combination of tightening nuts and a clamp to vary tension), and/or another device suitable to apply and/or release tension in a wire. In some examples, the tensioner is an electric tensioner that includes or is otherwise communicatively coupled to a power source. While the tensioners 904 of FIG. 9 are substantially equally spaced around the wire 902, the tensioners 904 can be include different spacing dimensions additional or alternative examples. While tension component 900 includes four tensioners 904 in the illustrated example of FIG. 9A, the tension component 900 can include more or less tensioners 904 in additional or alternative examples.

In operation, the tensioner(s) 904 apply a force (e.g., a clamping force) to the wire 902 to cause the wire 902 to change in diameter. For example, the tensioner(s) 904 can pull the wire 902 to reduce a diameter (e.g., increasing tip clearance 218) of the wire 902 or push the wire 902 to increase the diameter of the wire 902 (e.g., reducing tip clearance 218). In some examples, one or more tensioner(s) 904 can be used to isolate a certain part(s) (e.g., segment) of the wire 902 from the rest of the wire 902. The tensioner(s) 904 can be altered selectively to apply the force to the wire 902 at given location and/or based on an activation (e.g., power) level of the tensioner(s) 904. For example, a force applied by a tensioner(s) 904 can be varied across two or more tensioner(s) 904. In some examples, the tensioner(s) 904 can be used to contain tension in a segment of the wire 902 differently from the rest of the wire 902.

Figure 9B:
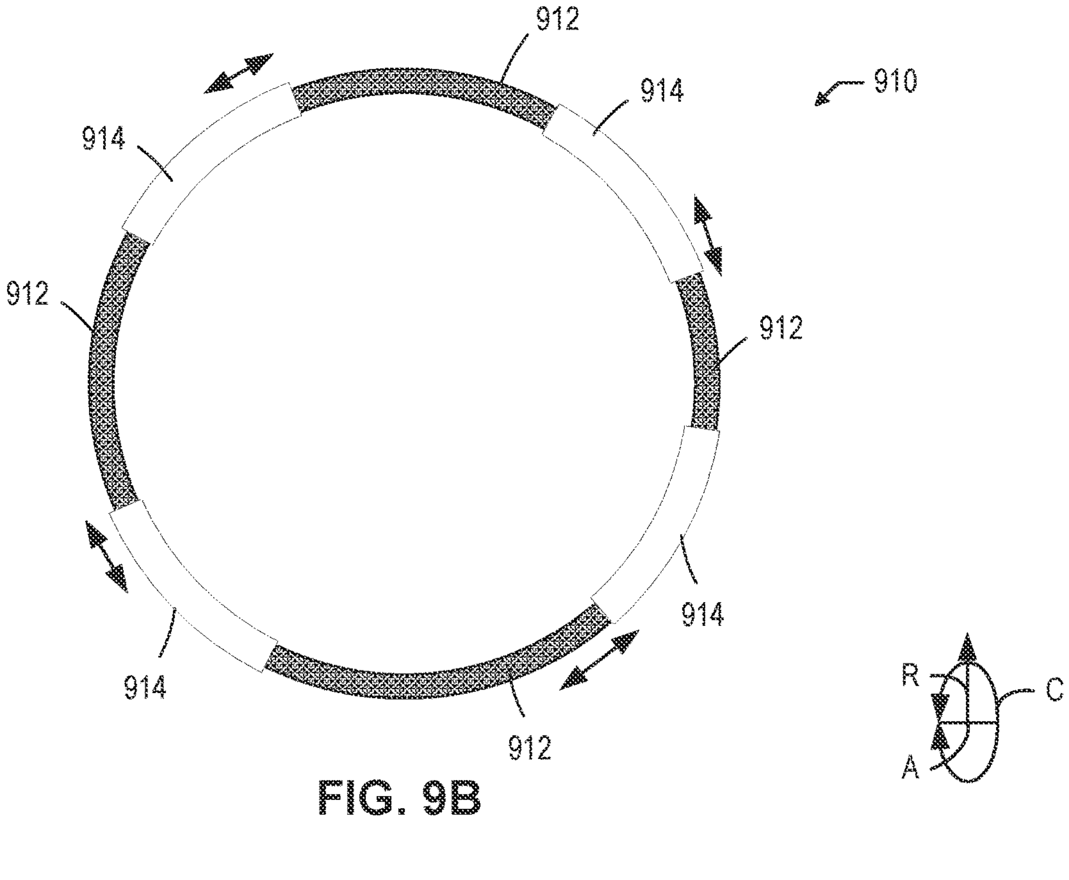
FIG. 9B is an illustration of another example tension component that can be applied to variable flowpath components constructed in accordance with the teachings of this disclosure.

FIG. 9B is an illustration of another example tension component 910 that can be applied to variable flowpath components 300, 500, 600 800 constructed in accordance with the teachings of this disclosure. For example, the tension component 900 can be positioned around a periphery of an inner substrate 304, positioned within a channel(s) 812, 814, etc. In some examples, the first tension component 910 implements tensioning means. The tension component 910 of FIG. 9B includes example wire segments 912 coupled to example shape memory alloy (SMA) segments 914. Each wire segment 912 is positioned between two adjacent SMA segments 914. While four wire segments 912 and four SMA segments 914 are illustrated in FIG. 9B, more or less segments 912, 914 can be included in additional or alternative examples.

As noted above, an SMA can be readily deformed by applying an external force and recovers to its original form upon application of a thermal or mechanical force. In operation, one or more SMA segments 914 can be simultaneously and/or selectively deformed (e.g., by passing current through the SMA). That is, each SMA segment 914 can be heated to varying levels by applying a load to the SMA segments 914 to induce tension along each respective length. A force in an SMA segment(s) 914 causes a respective wire segment(s) 912 on either side of the thermally activated SMA segment 914 to be pulled radially inwards. The radially inward movement of the SMA segment(s) 914 causes adjacent wire segments 912 to move radially inwards and reduce a diameter of the variable flowpath component 910. The force can be removed from the SMA segment(s) 914 to cause the SMA segment(s) 914 to move radially outwards, causing the wire segments 912 to move radially outwards and increasing a diameter of the variable flowpath component 910. In some examples, the SMA segments(s) 914 can selectively apply a force(s) on one or more wire segment(s) 912 to create a variable radius in those wire segment 912 regions compared to locations of wire segment(s) 912 where the SMA segment(s) 914 is not activated.

Figure 10:
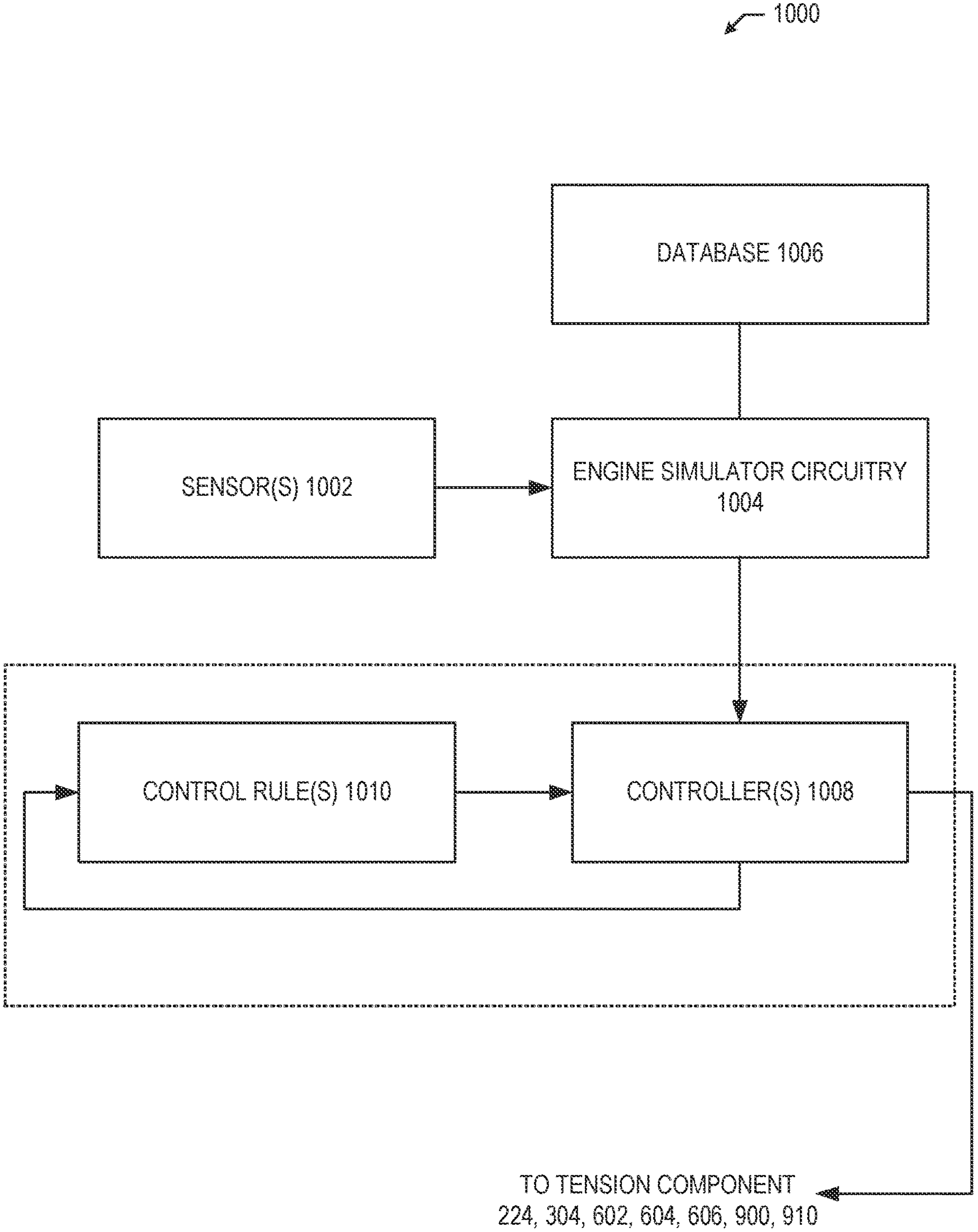
FIG. 10 is a block diagram of an example clearance control system to control a tip clearance between a rotor blade tip and a variable flowpath casing in accordance with the teachings of this disclosure.

FIG. 10 is a block diagram of an example clearance control system 1000 to determine tip clearance 218 and actuate a variable flowpath component 300, 500, 600, 800. The clearance control system 1000 of FIG. 10 may be instantiated (e.g., creating an instance of, bring into being for any length of time, materialize, implement, etc.) by processor circuitry such as a central processing unit executing instructions. Additionally or alternatively, the clearance control system 1000 of FIG. 10 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 10 may, thus, be instantiated at the same or different times. Some or all of the circuitry may be instantiated, for example, in one or more threads executing concurrently on hardware and/or in series on hardware. Moreover, in some examples, some or all of the circuitry of FIG. 10 may be implemented by one or more virtual machines and/or containers executing on the microprocessor.

The clearance control system 1000 includes at least one example sensor(s) 1002, which is structured to monitor components of a turbine engine (e.g., turbine engine 100). For example, the sensor(s) 1002 can sense any number of operating characteristic of the turbine engine 100 (e.g., during operation). The sensor(s) 1002 can include a temperature sensor to detect ambient temperature, a proximity sensor to detect tip clearance, an altitude sensor, power lever angle sensor, and/or another type of sensor(s).

The clearance control system 1000 includes example engine simulator circuitry 1004, which is structured to simulate the turbine engine 100 performance based on data from the sensor(s). In some examples, the engine simulator circuitry 1004 is instantiated by processor circuitry executing engine simulator instructions and/or configured to perform operations such as those represented by the flowchart of FIG. 11. During operation, the sensor(s) 1002 can sense an operating characteristic associated with variable flowpath casing 202. For instance, the operating characteristic can be the tip clearance 218. The engine simulator circuitry 1004 can receive data from the sensor(s) 1002 can analyze the data. In some examples, the engine simulator circuitry 1004 can apply a machine-learned model to determine whether to actuate an example variable flowpath component.

The clearance control system 1000 includes an example database 1006, which is storage circuitry for storing information. For example, the database 1006 can store data collected from the sensor(s) 1002, machine-learning model(s), and/or other information for maintaining clearance control.

The clearance control system 1000 includes an example controller 1008, which is structured to control one or more components of the turbine engine 100. The controller 1008 can be one controller and/or a system of controllers. In some examples, the controller 1008 can be an engine controller (e.g., an Electronic Engine Controller (EEC), an Electronic Control Unit (ECU), etc.). In some examples, the controller 1008 can be operated as a control device of a FADEC system. Based on information from the engine simulator circuitry 1004 and example control rules 1010, the controller 1008 can be configured to actuate an example tension component (e.g., tension component 224, 304, 602, 604, 606, 900, 910) in response to identification of a relatively large and/or relatively small tip clearance 218.

The clearance control system 1000 includes example control rules 1010, which determine an ideal or otherwise good tip clearance 218 of the turbine engine 100. Based on the tip clearance 218, the control rules 1010 provide information regarding when to actuate a variable flowpath component 300, 500, 600, 800 to increase and/or decrease the tip clearance 218 by adjusting a flowpath surface of a variable flowpath casing 202.

While an example manner of implementing the clearance control system 1000 of FIG. 10 is illustrated in FIG. 10, one or more of the elements, processes, and/or devices illustrated in FIG. 10 may be combined, divided, re-arranged, omitted, eliminated, and/or implemented in any other way. Further, the example engine simulator circuitry 1004, example controller 1008, and/or, more generally, the example clearance control system 1000 of FIG. 10, may be implemented by hardware alone or by hardware in combination with software and/or firmware. Thus, for example, any of the example engine simulator circuitry 1004, example controller 1008, and/or, more generally, the example clearance control system 1000, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example clearance control system 1000 of FIG. 10 may include one or more elements, processes, and/or devices in addition to, or instead of, those illustrated in FIG. 10, and/or may include more than one of any or all of the illustrated elements, processes and devices.

Figure 11:
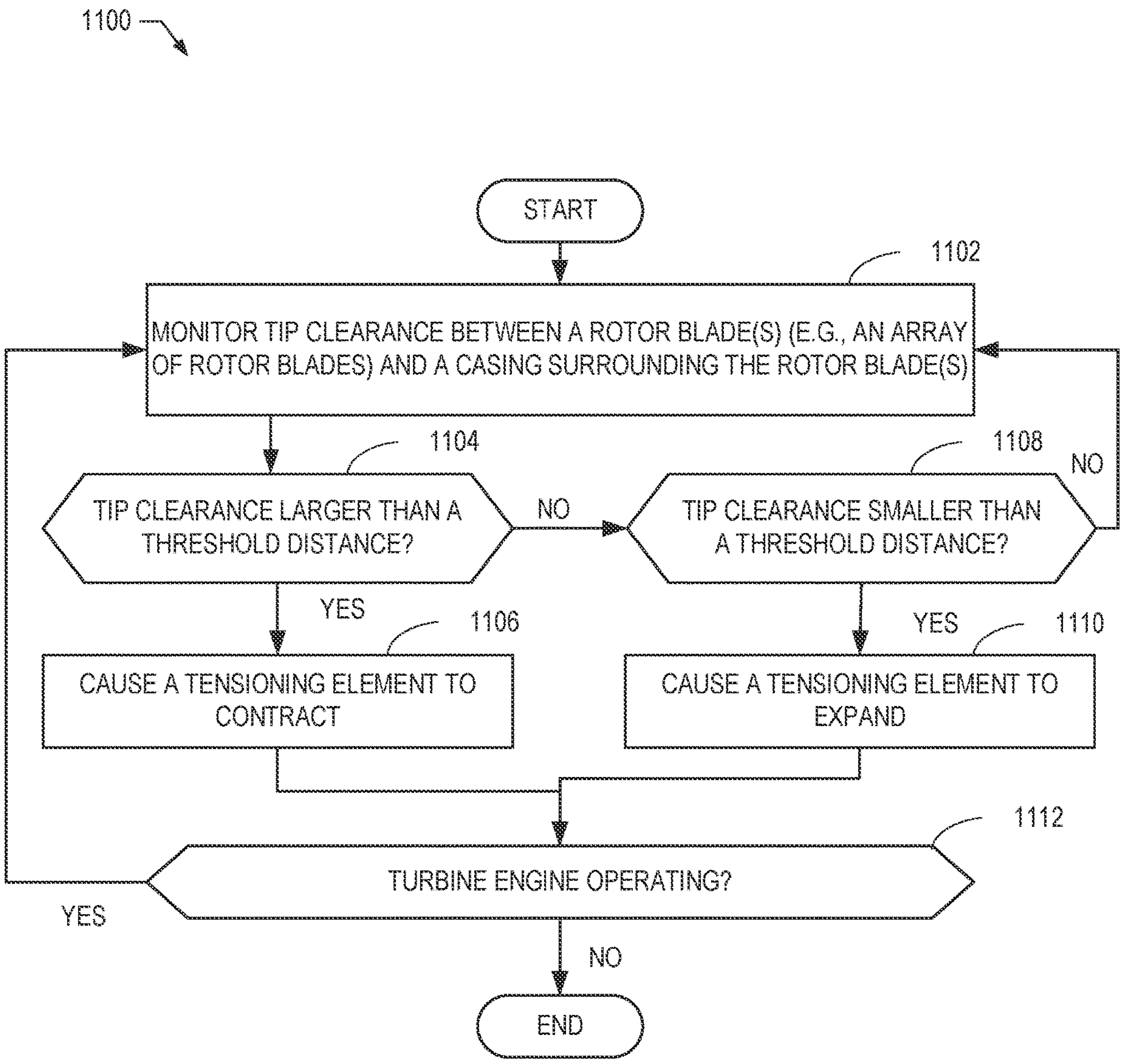
FIG. 11 is a flowchart representative of example machine readable instructions and/or example operations that may be executed by example processor circuitry to implement the clearance control system of FIG. 10.

A flowchart representative of example hardware logic circuitry, machine readable instructions, hardware implemented state machines, and/or any combination thereof for implementing the clearance control system 1000 of FIG. 10 is shown in FIG. 11. The machine readable instructions may be one or more executable programs or portion(s) of an executable program for execution by processor circuitry, such as the processor circuitry 1112 shown in the example processor platform 1100 discussed below in connection with FIG. 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 10, many other methods of implementing the example clearance control system 1000 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions and/or example operations 1100 that may be executed and/or instantiated by processor circuitry to actuate an example variable flowpath component. The machine readable instructions and/or the operations 1100 of FIG. 11 begin at block 1102, at which example engine simulator circuitry 1004 monitors tip clearance 218 between a rotor blade(s) 132, 152, 156, 212 (e.g., an array of rotor blades) and blade tip region 216 of a casing 108, 134, 138, 202 surrounding the rotor blades. For example, the engine simulator circuitry 1004 can receive sensor data from an example sensor(s) 1002 to determine tip clearance 218 (e.g., in real time).

At block 1104, the engine simulator circuitry 1004 determines whether the tip clearance 218 is larger than a threshold distance (e.g., 40 mils, etc.). When the answer to block 1104 is YES, control advances to block 1106 at which example controller 1008 causes a tension component 224, 304, 602, 604, 606, 900, 910 to contract to pull in an inner substrate and reduce a diameter of the inner substrate. Control then advances to block 1112. When the answer to block 1104 is NO, control advances to block 1108.

At block 1108, the engine simulator circuitry 1004 determines whether the tip clearance 218 is smaller than a threshold distance (e.g., 20 mils, etc.). When the answer to block 1108 is YES, control advances to block 1110, at which the example controller 1008 causes a tension component 224, 304, 602, 604, 606, 900, 910 to expand to allow the inner substrate to expand and increase a diameter of the inner substrate. Control then advances to block 1112. When the answer to block 1104 is NO, control advances to block 1102, at which the engine simulator circuitry 1004 continues to monitor tip clearance 218. At block 1112, the controller 1008 determines whether the turbine engine 100 is operating. When the answer to block 1112 is YES, control advances to block 1102, at which the engine simulator circuitry 1004 continues to monitor tip clearance 218.

Figure 12:
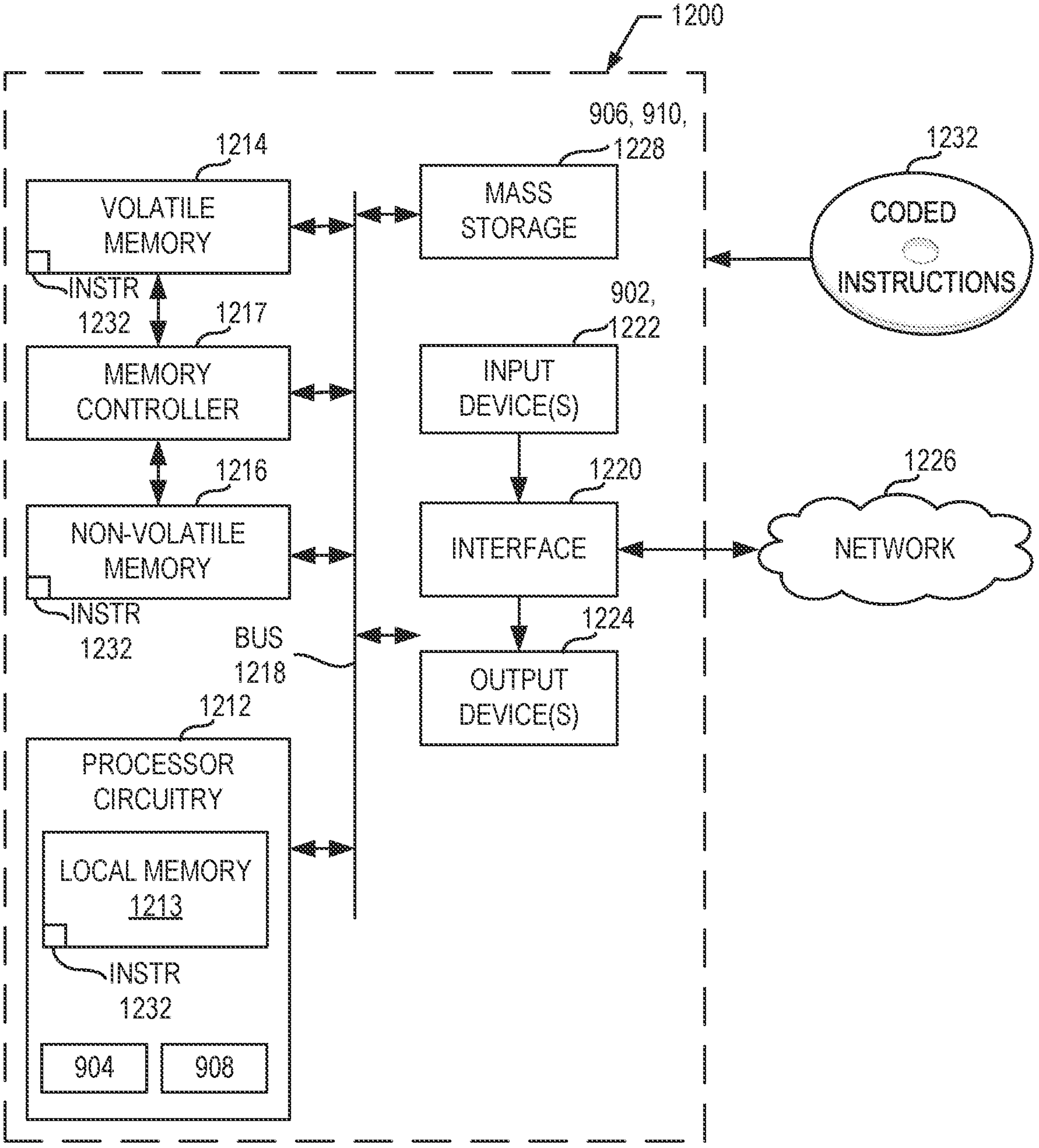
FIG. 12 is a block diagram of an example processing platform including processor circuitry structured to execute the example machine readable instructions and/or the example operations of FIG. 11 to implement the clearance control system of FIG. 10.

FIG. 12 is a block diagram of an example processor platform 1100 structured to execute and/or instantiate the machine readable instructions and/or the operations of FIG. 11 to implement the clearance control system 1000 of FIG. 10. The processor platform 1100 can be, for example, a server, a personal computer, a workstation, a self-learning machine (e.g., a neural network), a mobile device (e.g., a cell phone, a smart phone, a tablet such as an iPad™, a personal digital assistant (PDA), an Internet appliance, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the engine simulator circuitry 1004 and controller(s) 1008.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIG. 11, may be stored in the mass storage device 1128, in the volatile memory 1114, in the non-volatile memory 1116, and/or on a removable non-transitory computer readable storage medium such as a CD or DVD.

From the foregoing, it will be appreciated that example variable flowpath casing are disclosed herein that enable blade-tip-to-casing clearance control. Example variable flowpath casings disclosed herein include a variable flowpath surface implemented by an example variable flowpath mechanism to manage tip clearance. Example variable flowpath components disclosed herein can adjust a surface of an example variable flowpath casing to reduce a tip clearance that is larger than a desired tip clearance or to increase a tip clearance that is smaller than a desire tip clearance.

Further aspects of the present disclosure are provided by the subject matter of the following clauses:

Example 1 includes a casing for a turbine engine, the casing comprising a first annular substrate extending along an axial direction, the first annular substrate defining a cavity at a radially inward surface of the first annular substrate, a second annular substrate positioned at least partially within the cavity of the first annular substrate, and a tension belt extending circumferentially around a periphery of the second annular substrate.

Example 2 includes the casing of example 1, wherein the tension belt is pre-tensioned such that a radially inward surface of the second annular substrate is flush with the radially inward surface of the first annular substrate.

Example 3 includes the casing of any preceding clause, further including a layer of an abradable material on a radially inward surface of the second annular substrate.

Example 4 includes the casing of any preceding clause, wherein the second annular substrate includes a plurality of splits that extend along an axial direction of the second annular substrate, each of the splits defined by a length that is less than an axial length of the annular substrate, the splits forming a plurality of second annular substrate regions.

Example 5 includes the casing of any preceding clause, wherein the tension belt is pre-tensioned to support the second annular substrate regions circumferentially in a first position, and wherein the tension belt is tightened to pull the second annular substrate regions radially inwards to reduce a tip clearance between the casing and a rotor blade.

Example 6 includes the casing of any preceding clause, wherein the tension belt is loosened to increase a diameter of the second annular substrate to increase a tip clearance between the casing and a rotor blade.

Example 7 includes the casing of any preceding clause, wherein the tension belt is a wire.

Example 8 includes the casing of any preceding clause, wherein the wire is made of a shape memory alloy, and wherein the wire is controlled by causing a current to flow through the wire.

Example 9 includes the casing of any preceding clause, wherein the wire is made of a bi-metallic material that responds passively to an ambient change in temperature, and wherein the tension belt adjusts a diameter of the second annular substrate based on an ambient temperature.

Example 10 includes the casing of any preceding clause, wherein the second annular substrate includes a plurality of segments, adjacent segments slidably coupled at a junction, ones of the segments including a channel extending circumferentially withing the ones of the segments, and wherein the tension belt is positioned within the channels of the segments.

Example 11 includes the casing of any preceding clause, wherein the tension belt is tensioned to decrease a diameter of the second annular substrate, and wherein the tension belt is loosened increase a diameter of the second annular substrate.

Example 12 includes the casing of any preceding clause, wherein a first junction that slidably couples a first adjacent segment and a second adjacent segment prevents the first adjacent segment and the second adjacent segment from slidably moving beyond a defined distance to prevent the first adjacent segment and the second adjacent segment from separating when a diameter of the second annular substrate increases.

Example 13 includes a turbine engine comprising an array of rotor blades, and a turbine engine housing to surround the array of rotor blades, the turbine engine component including an outer shell, an inner ring positioned radially inward from the outer shell, the inner ring including a plurality of sections, ones of the sections coupled to adjacent ones of the sections, and a wire positioned circumferentially around a radially outward surface of the inner ring, the wire in surface contact with the inner ring.

Example 14 includes the casing of any preceding clause, wherein the turbine engine component further includes a viscoelastic material positioned between the outer shell and the inner ring.

Example 15 includes the casing of any preceding clause, wherein the turbine engine component further includes a honeycomb structure positioned between the outer shell and the inner ring.

Example 16 includes the casing of any preceding clause, wherein the turbine engine component further includes an actuator to adjust a diameter of the wire.

Example 17 includes the casing of any preceding clause, wherein the plurality of sections of the inner ring are separate sections that are coupled via a linkage.

Example 18 includes the casing of any preceding clause, wherein the plurality of sections of the inner ring are circumferentially connected at an axial position downstream of a leading edge of a rotor blade.

Example 19 includes the casing of any preceding clause, wherein an adjust of a diameter of the wire causes an adjust of a diameter of the inner ring.

Example 20 includes a casing for a turbine engine, the casing comprising first substrate means extending along an axial direction, the first substrate means defining a trench, second substrate means positioned at the trench of the first substrate means, and tensioning means extending circumferentially around the second substrate means.

Example 21 includes the casing for the turbine engine of any preceding claim, wherein the tensioning means is pretensioned such that a radially inward surface of the second substrate means is flush with the radially inward surface of the first substrate means.

Example 22 includes the casing for the turbine engine of any preceding claim, further including abradable means on a radially inward surface of the second substrate means.

Example 23 includes the casing for the turbine engine of any preceding claim, wherein the second substrate means includes a plurality of splits that extend along an axial direction of the second substrate means, each of the splits defined by a length that is less than an axial length of the second substrate means, the splits forming a plurality of second substrate means regions.

Example 24 includes the casing for the turbine engine of any preceding claim, wherein the tensioning means is pretensioned to support the second substrate means regions circumferentially in a first position, and wherein the tensioning means is tightened to pull the second substrate means regions radially inwards to reduce a tip clearance between the casing and a rotor blade.

Example 25 includes the casing for the turbine engine of any preceding claim, wherein the tensioning means is loosened to increase a diameter of the second substrate means to increase a tip clearance between the casing and a rotor blade.

Example 26 includes the casing for the turbine engine of any preceding claim, wherein the tensioning means is a wire.

Example 27 includes the casing for the turbine engine of any preceding claim, wherein the wire is made of a shape memory alloy, and wherein the wire is controlled by causing a current to flow through the wire.

Example 28 includes the casing for the turbine engine of any preceding claim, wherein the wire is made of a bimetallic material that responds passively to an ambient change in temperature, and wherein the tensioning means adjusts a diameter of the second substrate means based on an ambient temperature.

Example 29 includes the casing for the turbine engine of any preceding claim, wherein the second substrate means includes a plurality of segments, adjacent segments slidably coupled at junction means, ones of the segments including a channel extending circumferentially withing the ones of the segments, and wherein the tensioning means is positioned within the channels of the segments.

Example 30 includes the casing for the turbine engine of any preceding claim, wherein the tensioning means is tensioned to decrease a diameter of the second substrate means, and wherein the tensioning means is loosened increase a diameter of the second substrate means.

Example 31 includes the casing for the turbine engine of any preceding claim, wherein a first junction means that slidably couples a first adjacent segment and a second adjacent segment prevents the first adjacent segment and the second adjacent segment from slidably moving beyond a defined distance to prevent the first adjacent segment and the second adjacent segment from separating when a diameter of the second substrate means increases.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A casing for a turbine engine, the casing comprising:

a first annular substrate extending along an axial direction, the first annular substrate defining a cavity at a radially inward surface of the first annular substrate;

a second annular substrate positioned at least partially within the cavity of the first annular substrate, the second annular substrate including a plurality of axially extending and circumferentially spaced splits forming a plurality of second annular substrate regions, each split extending an axial distance that is less than an axial length of the second annular substrate; and a tension belt extending circumferentially around a surface of the second annular substrate, the tension belt having a first diameter to support the second annular substrate at a first position, the tension belt adjustable to a second diameter to support the second annular substrate at a second position that is radially inward relative to the first position such that the second annular substrate is movable relative to the first annular substrate based on whether the tension belt has the first diameter or the second diameter, wherein the tension belt is spaced apart from the first annular substrate at the second diameter.

2. The casing of claim 1, wherein a radially inward surface of the second annular substrate is flush with the radially inward surface of the first annular substrate when the tension belt has the first diameter.

3. The casing of claim 1, further including a layer of an abradable material on a radially inward surface of the second annular substrate.

4. The casing of claim 1, wherein the tension belt is adjustable to the second diameter to pull the second annular substrate regions radially inward to reduce a tip clearance between the casing and a rotor blade.

5. The casing of claim 1, wherein the tension belt is adjustable to a third diameter to support the second annular substrate regions at a third position that is radially between the first position and the second position to adjust a tip clearance between the casing and a rotor blade.

6. The casing of claim 1, wherein the tension belt is a wire.

7. The casing of claim 6, wherein the wire includes a shape memory alloy, and wherein the wire is adjustable between the first diameter and the second diameter based on a flow of current through the wire.

8. The casing of claim 6, wherein the wire includes a bi-metallic material that responds to an ambient change in temperature, and wherein the tension belt adjusts between the first diameter and the second diameter based on the ambient change in the temperature.

9. The casing of claim 1, wherein the tension belt is a first tension belt having a first material, further including a second tension belt positioned axially adjacent the first tension belt, the second tension belt having a second material that is different than the first material.

10. A turbine engine comprising:

an array of rotor blades; and a turbine engine housing to surround the array of rotor blades, the turbine engine housing including:

an outer shell;

an inner ring positioned radially inward from the outer shell, the inner ring including a plurality of circumferentially arranged sections, each section including a respective channel extending circumferentially therethrough, each section slidably coupled to a circumferentially adjacent section by a respective joint, the respective joint structured to maintain the circumferential adjacent sections within a defined distance relative to one another; and a wire extending through the channels, the wire adjustable from a first diameter to a second diameter at which the wire is a radially spaced apart from the outer shell, the wire in surface contact with the inner ring to retain the inner ring at a first circumferential position at the first diameter and a second circumferential position at the second diameter.

11. The turbine engine of claim 10, wherein the turbine engine housing further includes a viscoelastic material positioned between the outer shell and the inner ring.

12. The turbine engine of claim 10, wherein the turbine engine housing further includes a honeycomb structure positioned between the outer shell and the inner ring.

13. The turbine engine of claim 10, wherein the turbine engine housing further includes an actuator to cause the wire to move between the first diameter and the second diameter.

14. The turbine engine of claim 10, wherein the plurality of the sections of the inner ring are circumferentially connected at an axial position downstream of a leading edge of a rotor blade.

15. The turbine engine of claim 10, wherein an adjustment of the wire from the first diameter to the second diameter causes an adjustment of a diameter of the inner ring.

16. The turbine engine of claim 10, further including a tensioner coupled to the wire, the tensioner to apply a force to the wire to cause the wire to adjust from the first diameter to the second diameter.

17. A casing for a turbine engine, the casing comprising:

first housing means extending along an axial direction, the first housing means defining a trench;

second housing means positioned at the trench of the first housing means; and tensioning means extending circumferentially around the second housing means, the tensioning means moveable between a first diameter that causes the second housing means to be at a first distance relative to the first housing means and a second diameter that causes the second housing means to be at a second distance relative to the first housing means, the first distance associated with a first blade tip clearance, the second distance associated with a second blade tip clearance that is smaller relative to the first blade tip clearance, the tensioning means radially spaced apart from the first housing means at the second diameter, wherein the tensioning means includes a wire, the wire including at least one of a shape memory alloy or a bi-metallic material, the tensioning means adjustable from the first diameter to the second diameter based on a temperature change of the wire.

18. The casing of claim 17, wherein the wire includes a shape memory alloy, and wherein the temperature change of the wire is based on a flow of current through the wire.

19. The casing of claim 17, wherein the wire includes a bi-metallic material, and wherein the temperature change of the wire is based on an ambient temperature.

20. The casing of claim 17, wherein the second housing means includes a plurality of splits that extend along an axial direction of the second housing means, each of the splits defined by a first axial length that is less than a second axial length of the second housing means.

* * * * *